(12) United States Patent
Ding et al.

(10) Patent No.: US 12,717,119 B2
(45) Date of Patent: Aug. 25, 2026

(54) CAMERA MODULE

(71) Applicant: Zhejiang Sunny Optics Co., Ltd, Yuyao City (CN)

(72) Inventors: Ren Ding, Yuyao City (CN); Qionghua Zhou, Yuyao City (CN); Zeguang Wang, Yuyao City (CN); Hui Li, Yuyao City (CN); Yazhu Song, Yuyao City (CN); Jiadong Zhu, Yuyao City (CN); Xiancui Ding, Yuyao City (CN); Lin Huang, Yuyao City (CN); Liefeng Zhao, Yuyao City (CN); Fujian Dai, Yuyao City (CN)

(73) Assignee: Zhejiang Sunny Optics Co., Ltd, Yuyao City (CN)

( * ) Notice: Subject to any disclaimer, the term of this patent is extended or adjusted under 35 U.S.C. 154(b) by 590 days.

(21) Appl. No.: 18/299,290

(22) Filed: Apr. 12, 2023

(65) Prior Publication Data

US 2024/0192486 A1 Jun. 13, 2024

(30) Foreign Application Priority Data

Dec. 13, 2022 (CN) ......................... 202211595598.4

(51) Int. Cl.

| | |
|---|---|
| ***G02B 13/00*** | (2006.01) |
| ***G02B 7/02*** | (2021.01) |
| ***G02B 9/64*** | (2006.01) |

(52) U.S. Cl.

CPC ......... *G02B 13/0045* (2013.01); *G02B 7/021* (2013.01); *G02B 7/026* (2013.01); *G02B 9/64* (2013.01)

(58) Field of Classification Search

CPC .... G02B 13/0045; G02B 7/021; G02B 7/026; G02B 9/64

See application file for complete search history.

(56) References Cited

U.S. PATENT DOCUMENTS

2019/0369368 A1* 12/2019 Jung .................. G02B 13/0045

* cited by examiner

*Primary Examiner* — Wen Huang

(74) *Attorney, Agent, or Firm* — Sughrue Mion, PLLC

(57) ABSTRACT

A camera module. The camera module includes a lens barrel, and a first lens, a second lens, a third lens, a fourth lens, a fifth lens, a sixth lens, a seventh lens having a negative refractive power provided in the lens barrel, and a spacer arranged between the sixth lens and the seventh lens on the optical axis of the camera module. An effective focal length f7 of the seventh lens, an inner diameter d6m of an image-side surface of the sixth spacer, an air interval T67 between the sixth lens and the seventh lens along the optical axis, and a maximum thickness CP6 of the sixth spacer satisfy: $1.0<|d6m/f7|+T67/CP6<8.5$.

20 Claims, 7 Drawing Sheets

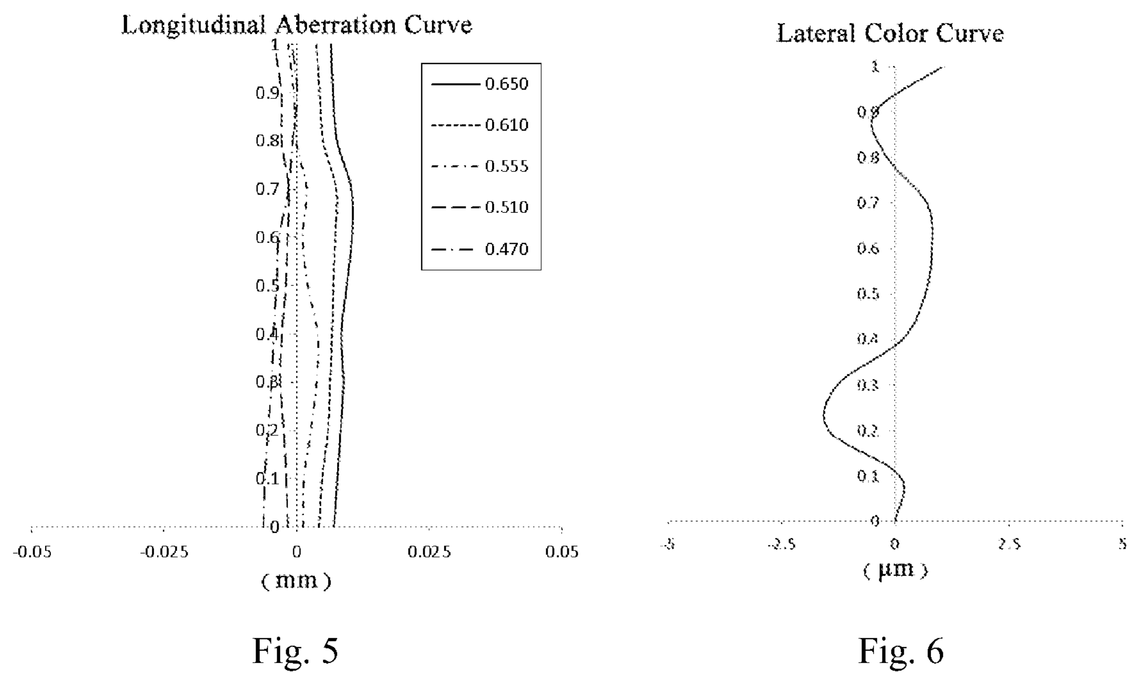
Fig. 5
Fig. 6
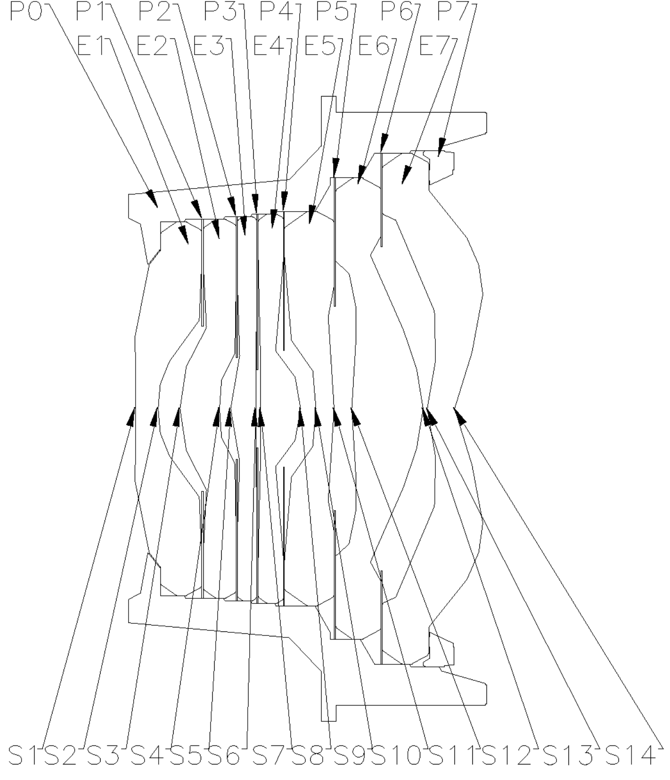
Fig. 7

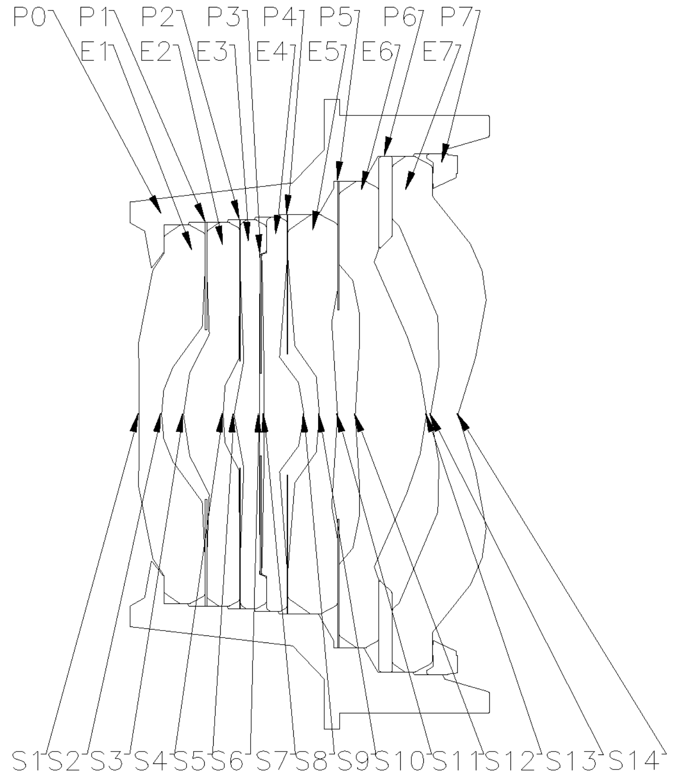
Fig. 8
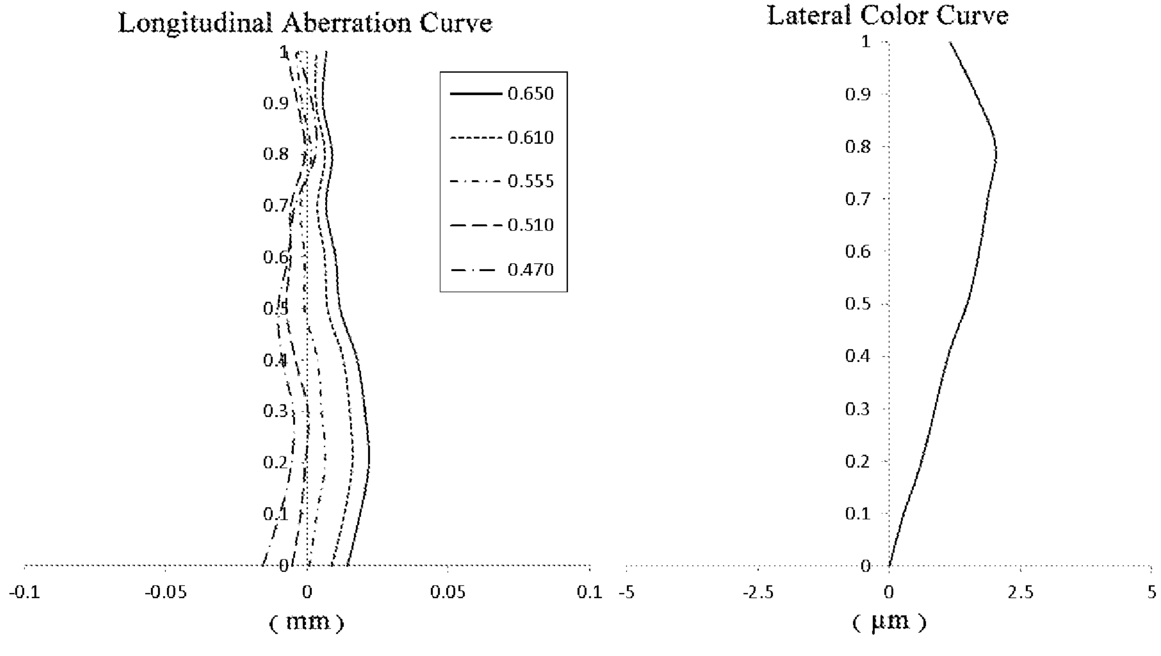
Fig. 9
Fig. 10

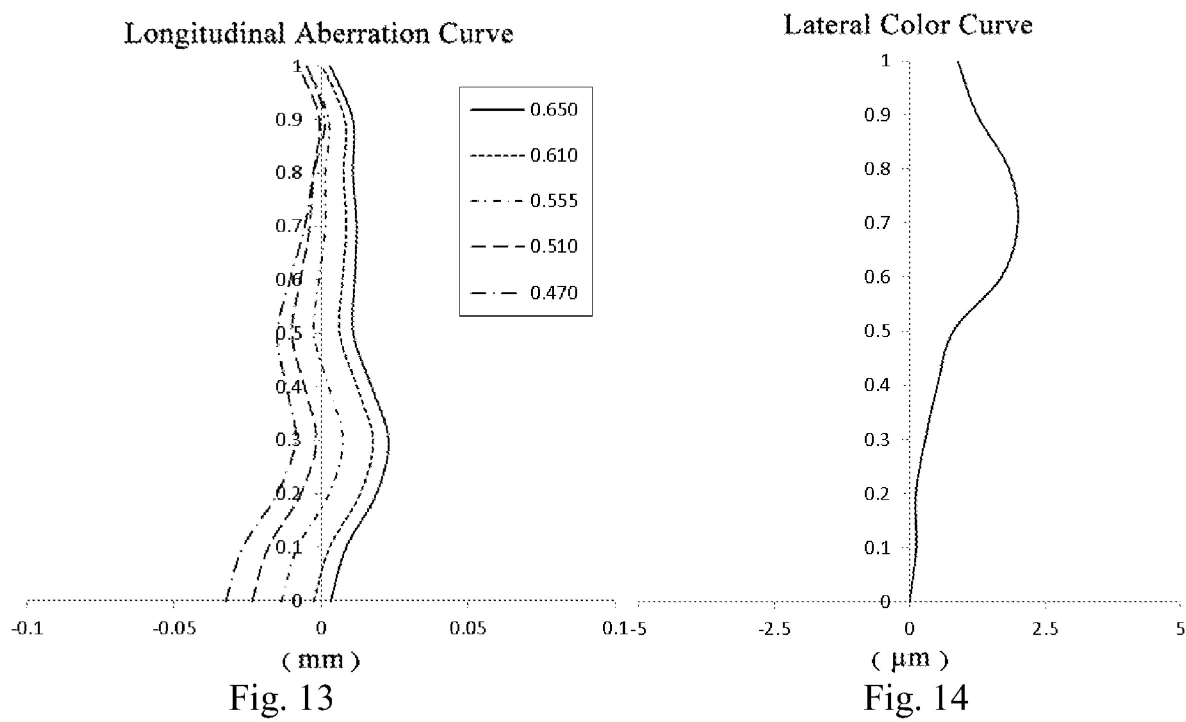
Fig. 13
Fig. 14
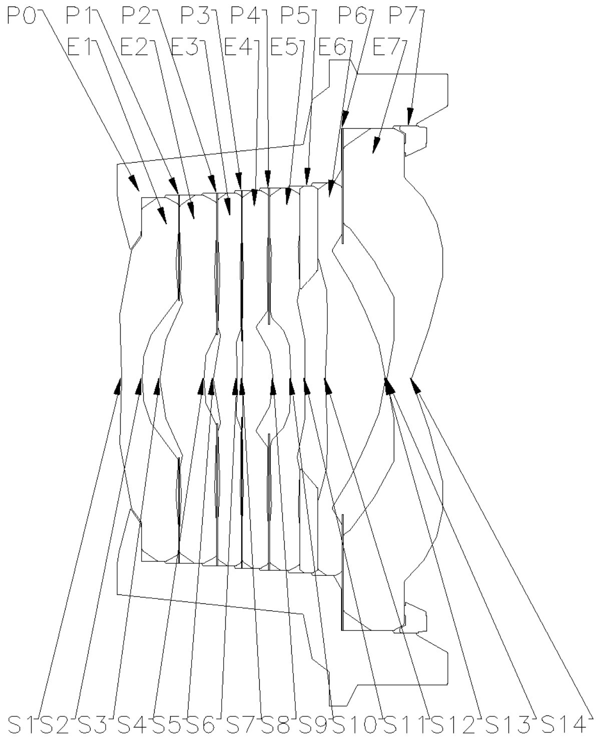
Fig. 15

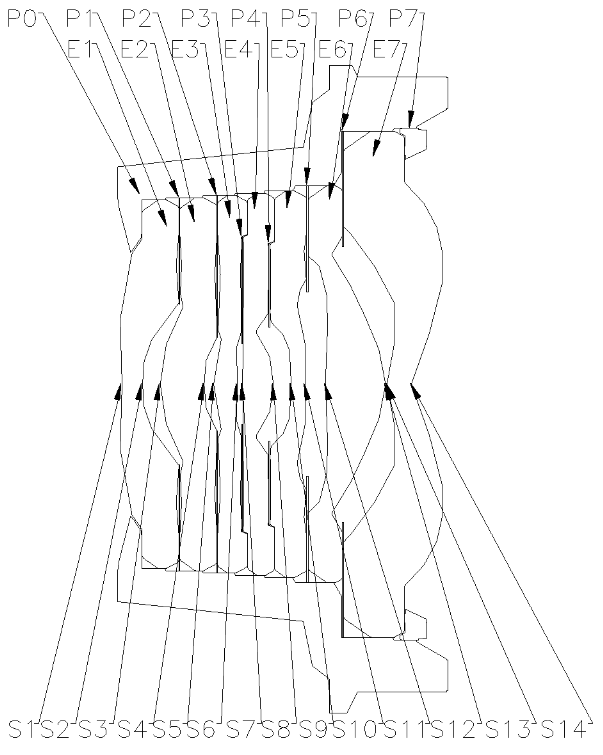
Fig. 16
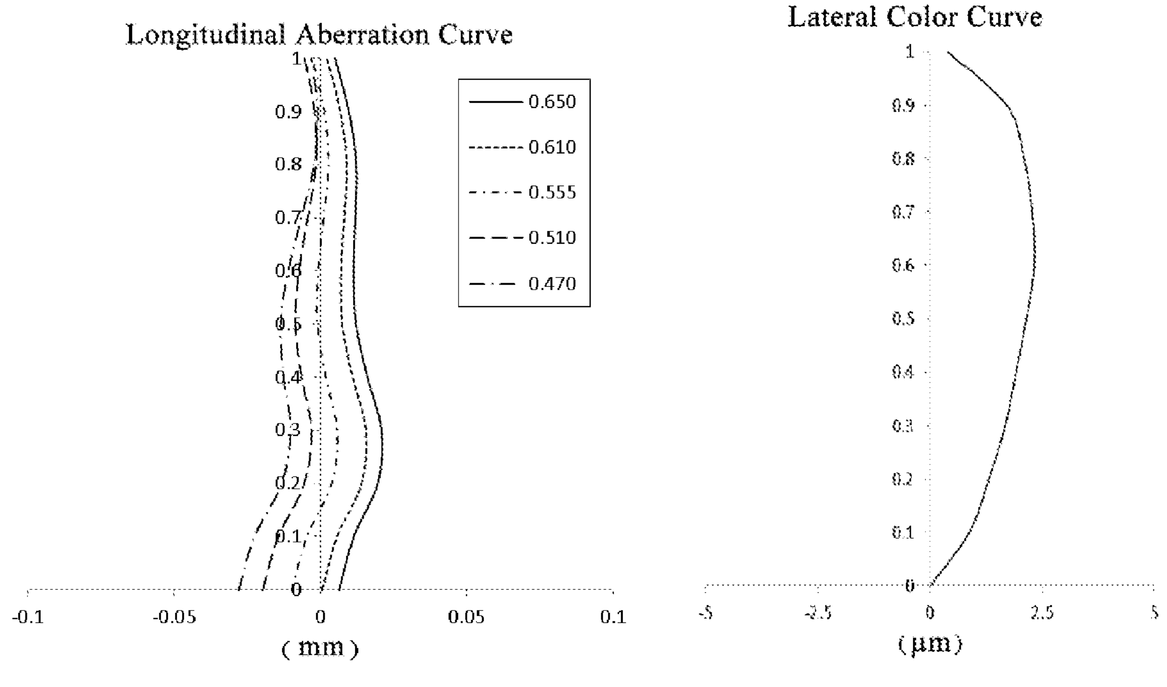
Fig. 17
Fig. 18

CAMERA MODULE

CROSS-REFERENCE TO RELATED APPLICATIONS

This application claims benefit of priority to Chinese Patent Application No. 202211595598.4 filed on Dec. 13, 2022 before the China National Intellectual Property Administration, the entire disclosure of which is incorporated herein by reference in its entity.

TECHNICAL FIELD

The present invention relates to the technical field of optical imaging devices, and specifically, relates to a camera module.

BACKGROUND

In recent years, with the rapid development and upgrading of the mobile phone industry, the demand for camera modules applied to mobile phones has also shown a diversified growth. With the increasing number of scenarios in which mobile phone shooting functions are applied, traditional camera module parameters are no longer sufficient to meet the needs of many scenarios. While pursuing high pixels, the mobile phone market is also moving towards gradually expanding the field-of-view and small distortion, thereby obtaining a larger shooting area. In order to meet the needs of ultra wide-angle, a large number of lenses are usually used, mostly of the six-piece type. The increase in the number of lenses increases the stray light at the edge positions of adjacent lenses, which is not beneficial to imaging. At the same time, the number of lenses makes it difficult to ensure the assembly stability of the lens barrel. In addition, in order to achieve ultra wide-angle during the design process, the lens is relatively sensitive and difficult to process.

In other words, the camera module in the prior art has problems that it is difficult to take into account ultra-wide angle, low stray light, and assembly stability simultaneously.

SUMMARY

The main purpose of the present invention is to provide a camera module to solve the problem that ultra-wide angle, low stray light, and assembly stability cannot be simultaneously considered in the camera module in the prior art.

In order to achieve the above purpose, the present invention provides a camera module including a lens barrel, and a first lens, a first spacer, a second lens, a second spacer, a third lens, a third spacer, a fourth lens, a fourth spacer, a fifth lens, a fifth spacer, a sixth lens, a sixth spacer, and a seventh lens having negative refractive power, which are sequentially arranged in the lens barrel along an optical axis of the lens barrel from an object side to an image side. Each spacer in the first spacer to the sixth spacer is at least partially in contact with an image-side surface of a lens arranged on an object side of the spacer, and each spacer in the first spacer to the sixth spacer is capable of shielding light from entering an edge structure portion of a lens arranged on an image side of the spacer; an object-side end of the lens barrel is provided with a supporting portion extending in a direction directing to the optical axis, and an object-side surface of the first lens is at least partially abutted with the supporting portion. An effective focal length f7 of the seventh lens, an inner diameter d6m of an image-side surface of the sixth spacer, an air interval T67 between the sixth lens and the seventh lens along the optical axis, and a maximum thickness CP6 of the sixth spacer satisfy: $1.0<|d6m/f7|+T67/CP6<8.5$.

Further, the first spacer to the sixth spacer include one or more kinds of: spacer ring, septum.

Further, each of the first spacer to the sixth spacer is a septum; or the fifth spacer is a spacer ring, and each of the first spacer to the fourth spacer and the sixth spacer is a septum; or each of the fifth spacer and the sixth spacer is a spacer ring, and each of the first spacer to the fourth spacer is a septum.

Further, the camera module also includes a pressing ring, the pressing ring being arranged on the image side of the seventh lens and abutting simultaneously with an image-side surface of the seventh lens and the internal face of the lens barrel.

Further, the outer peripheries of the first spacer to the sixth spacer includes one or more kinds of: abutting with a lens, abutting with an internal face of the lens barrel; when an outer periphery of a spacer abuts a lens, two adjacent lenses adjacent with the spacer are arranged as being snap-fitted, the spacer is located at a position where the two adjacent lenses are snap-fitted, and the outer periphery of the spacer abuts a lens located on the object side in the two adjacent lenses.

Further, a radius of curvature R2 of an image-side surface of the first lens, a radius of curvature R3 of an object-side surface of the second lens, an outer diameter D1s of an object-side surface of the first spacer, an outer diameter D1m of an image-side surface of the first spacer, an inner diameter d1s of the object-side surface of the first spacer, and an inner diameter d1m of the image-side surface of the first spacer satisfy: $24.0<R2*(D1s-d1s)/(R3*(D1m-d1m))<56.0$.

Further, an effective focal length f1 of the first lens, an outer diameter D1s of an object-side surface of the first spacer, a maximum thickness CP1 of the first spacer, and an air interval T12 between the first lens and the second lens along the optical axis satisfy: $13.0<f1/D1s+T12/CP1<23.0$.

Further, an effective focal length f2 of the second lens, an inner diameter dim of an image-side surface of the first spacer, and an inner diameter d2s of an object-side surface of the second spacer satisfy: $6.0<f2/(d1m-d2s)<9.0$.

Further, an effective focal length f1 of the first lens, an effective focal length f2 of the second lens, an air interval T12 between the first lens and the second lens along the optical axis, an air interval T34 between the third lens and the fourth lens along the optical axis, a maximum thickness CP1 of the first spacer, and a maximum thickness CP2 of the second spacer satisfy: $-13.0<f2*(T12+CP1)/(f1*(T34+CP2))<-6.5$.

Further, an effective focal length f3 of the third lens, a center thickness CT3 of the third lens along the optical axis, an interval EP23 between the second spacer and the third spacer, and a maximum thickness CP3 of the third spacer satisfy: $24.0<f3/CT3+f3/(EP23+CP3)<38.0$.

Further, a radius of curvature R5 of an object-side surface of the third lens, an outer diameter D3s of an object-side surface of the third spacer, an outer diameter D2m of an image-side surface of the second spacer, an inner diameter d2m of an image-side surface of the second spacer, and an inner diameter d3s of an object-side surface of the third spacer satisfy: $11.0<R5/|D3s-D2m|+R5/(d2m-d3s)<67.0$.

Further, an effective focal length f4 of the fourth lens, a center thickness CT4 of the fourth lens along the optical axis, an inner diameter d4s of an object-side surface of the fourth spacer, an inner diameter d3m of an image-side surface of the third spacer, and an interval EP34 between the third spacer and the fourth spacer satisfy: $6.0<f4/CT4+(d4s-d3m)/EP34<7.5$.

Further, an air interval T45 between the fourth lens and the fifth lens along the optical axis, a maximum thickness CP4 of the fourth spacer, an outer diameter D4s of an object-side surface of the fourth spacer, and a radius of curvature R8 of an image-side surface of the fourth lens satisfy: $9.0<T45/CP4+D4s/R8<24.0$.

Further, an effective focal length f5 of the fifth lens, a center thickness CT5 of the fifth lens along the optical axis, an air interval T56 between the fifth lens and the sixth lens along the optical axis, an interval EP45 between the fourth spacer and the fifth spacer, and a maximum thickness CP5 of the fifth spacer satisfy: $-34.0<f5/(CT5+T56)+f5/(EP45+CP5)<-17.0$.

Further, a radius of curvature R9 of an object-side surface of the fifth lens, a radius of curvature R10 of an image-side surface of the fifth lens, an outer diameter D5s of an object-side surface of the fifth spacer, and an inner diameter d5s of an object-side surface of the fifth spacer satisfy: $1.5<|R9/R10|*(D5s/d5s)<10.0$.

Further, an effective focal length f5 of the fifth lens, an effective focal length f6 of the sixth lens, an outer diameter Dos of an object-side surface of the sixth spacer, and an outer diameter D5m of an image-side surface of the fifth spacer satisfy: $-6.5<(f5+f6)/(D6s-D5m)<-2.0$.

Further, an effective focal length f6 of the sixth lens, a center thickness CT6 of the sixth lens along the optical axis, and an interval EP56 between the fifth spacer and the sixth spacer satisfy: $5.0<f6/EP56+f6/CT6<8.0$.

Further, half of a maximum field-of-view Semi-FOV of the camera module, an effective focal length f7 of the seventh lens, and an inner diameter d6s of an object-side surface of the sixth spacer satisfy: $4.0<Tan(Semi-FOV)+|d6s/f7|<5.5$.

Applying the technical scheme of the present invention, the camera module includes a lens barrel, and a first lens, a first spacer, a second lens, a second spacer, a third lens, a third spacer, a fourth lens, a fourth spacer, a fifth lens, a fifth spacer, a sixth lens, a sixth spacer, and a seventh lens having negative refractive power, which are sequentially arranged in the lens barrel along an optical axis of the lens barrel from an object side to an image side. Each spacer in the first spacer to the sixth spacer is at least partially in contact with an image-side surface of a lens arranged on an object side of the spacer, and each spacer in the first spacer to the sixth spacer is capable of shielding light from entering an edge structure portion of a lens arranged on an image side of the spacer; an object-side end of the lens barrel is provided with a supporting portion extending in a direction directing to the optical axis, and an object-side surface of the first lens is at least partially abutted with the supporting portion. An effective focal length f7 of the seventh lens, an inner diameter d6m of an image-side surface of the sixth spacer, an air interval T67 between the sixth lens and the seventh lens along the optical axis, and a maximum thickness CP6 of the sixth spacer satisfy: $1.0<|d6m/f7|+T67/CP6<8.5$.

By setting spacers between adjacent two lenses, on the one hand, it is beneficial for the adjacent two lenses to stably contact and support the spacers, ensuring the stability of assembly; on the other hand, a spacer may shield light from entering the edge structure portion of the lens on the image side of the spacer, so that the spacer may absorb stray light, so as to reduce the transmission of stray light at the lens edge and improve stray light. By reasonably setting the sixth spacer and reasonably restricting the effective focal length of the seventh lens, the optical back focal distance is within an ideal range, making the total length of the camera module controllable, so that while ensuring ultra-wide angle characteristics, the miniaturization and thinness of the camera module are also ensured, which are conducive to applying the camera module in lightweight products. At the same time, in combination with the inner diameter of the image-side surface of the sixth spacer, the air interval between the sixth lens and the seventh lens along the optical axis, and the maximum thickness of the sixth spacer, the spatial position of the seventh lens along the optical axis may be effectively controlled so that it does not protrude from the rear end of the lens barrel and avoid scratching of the seventh lens. At the same time, it is beneficial to the stable support between the seventh lens and the sixth spacer and the stable contact between the seventh lens and the internal face of the lens barrel. By closely fitting the spacers and the lenses in the lens barrel while constraining the above parameters, it is beneficial to avoid the ghost image problem between the sixth lens and seventh lens, and to solve the unstable assembly caused by the unreasonable thickness design of the sixth spacer. At the same time, it enables the sixth spacer to effectively intercept the edge light entering the edge structure portion of the seventh lens, thereby to avoid generating internal stray light.

BRIEF DESCRIPTION OF THE DRAWINGS

The accompanying drawings of the specification that form a part of the present disclosure are intended to provide a further understanding of the present invention. The illustrative examples and explanations of the present invention are used to explain the invention and do not constitute an improper limitation of the present invention. In the drawings:

FIG. 5 and FIG. 6 illustrate longitudinal aberration curves and a lateral color curve of example 1 of the present invention, respectively;

FIG. 7 shows a schematic structural view of a camera module in a first state of example 2 of the present invention;

FIG. 8 shows a schematic structural view of a camera module in a second state of example 2 of the present invention;

FIG. 9 and FIG. 10 illustrate longitudinal aberration curves and a lateral color curve of example 2 of the present invention, respectively;

FIG. 13 and FIG. 14 illustrate longitudinal aberration curves and a lateral color curve of example 3 of the present invention, respectively;

FIG. 15 shows a schematic structural view of a camera module in a first state of example 4 of the present invention;

FIG. 16 shows a schematic structural view of a camera module in a second state of example 4 of the present invention; and FIG. 17 and FIG. 18 illustrate longitudinal aberration curves and a lateral color curve of example 4 of the present invention, respectively.

Figures 1, 2:
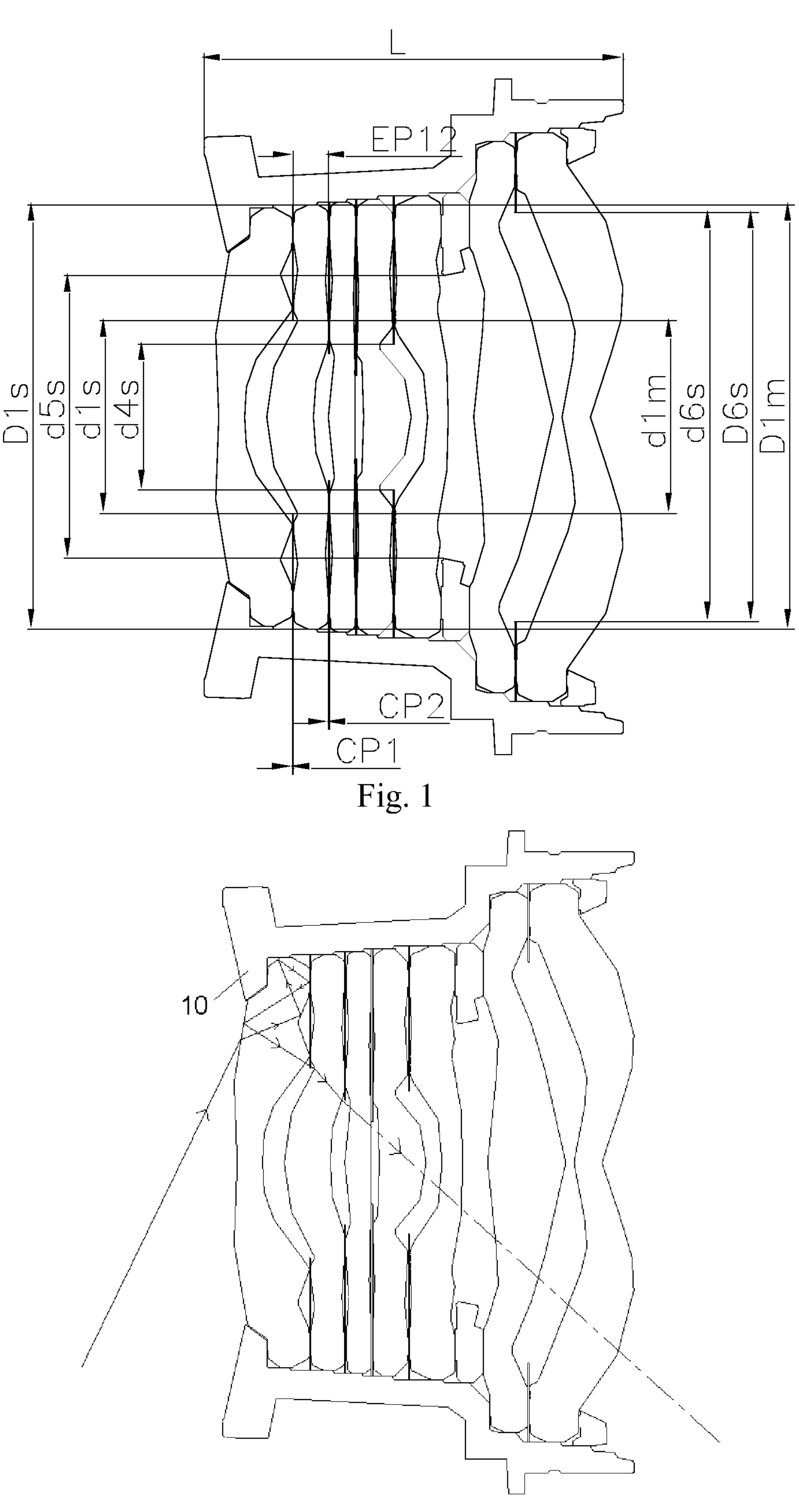
FIG. 1 shows a dimensioned diagram of a camera module according to an optional example of the present invention.
FIG. 2 shows a stray light diagram of a camera module according to an optional example of the present invention.

The above drawings include the following reference numerals:

P0: lens barrel; E1: first lens; S1: object-side surface of the first lens; S2: image-side surface of the first lens; E2: second lens; S3: object-side surface of the second lens; S4: image-side surface of the second lens; E3: third lens; S5: object-side surface of the third lens; S6: image-side surface of the third lens; E4: fourth lens; S7: object-side surface of the fourth lens; S8: image-side surface of the fourth lens; E5: fifth lens; S9: object-side surface of the fifth lens; S10: image-side surface of the fifth lens; E6: sixth lens; S11: object-side surface of the sixth lens; S12: image-side surface of the sixth lens; E7: seventh lens; S13: object-side surface of the seventh lens; S14: image-side surface of the seventh lens; P1: first spacer; P2: second spacer; P3: third spacer; P4: fourth spacer; P5: fifth spacer; P6: sixth spacer; P7: pressing ring; 10: supporting portion.

DETAILED DESCRIPTION OF EMBODIMENTS

It should also be noted that, the examples in the present disclosure and the features in the examples may be combined with each other on a non-conflict basis. The present invention will be described in detail below with reference to the accompanying drawings and in combination with the examples.

It should be noted that, unless otherwise specified, all technical and scientific terms used in the present disclosure have the same meanings as those commonly understood by ordinary technical personnel in the technical field to which this application belongs.

In the present invention, without explanation to the contrary, the use of orientation words such as "up, down, top, and bottom" is usually directed in the direction shown in the drawings, or in the upright, vertical, or gravitational direction of the component itself. Similarly, for ease of understanding and description, "inside and outside" refers to the inside and outside relative to the contour of each component itself, but the aforementioned orientation words are not intended to limit the invention.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. The judgment of the surface shape of the paraxial area may be based on the judgment method commonly used by those skilled in the field, using the R value, which refers to the radius of curvature at the paraxial area, and generally refers to the R value on the lens data in optical software, to determine the concavity and convexity. For the light incident side, when the R value is positive, it is determined as a convex surface, and when the R value is negative, it is determined as a concave surface. For the light emitting side, when the R value is positive, it is determined as a concave surface, and when the R value is negative, it is determined as a convex surface.

In order to solve the problem that the camera module in the prior art has ultra-wide angle, low stray light, and assembly stability that are difficult to take into account simultaneously, embodiments of the present invention provide a camera module.

As shown in FIG. 1 to FIG. 18, the camera module includes a lens barrel, and a first lens, a first spacer, a second lens, a second spacer, a third lens, a third spacer, a fourth lens, a fourth spacer, a fifth lens, a fifth spacer, a sixth lens, a sixth spacer, and a seventh lens having negative refractive power, which are sequentially arranged in the lens barrel along an optical axis of the lens barrel from an object side to an image side. Each spacer in the first spacer to the sixth spacer is at least partially in contact with the image-side surface of a lens arranged on the object side of the spacer, and each spacer in the first spacer to the sixth spacer is capable of shielding light from entering the edge structure portion of a lens arranged on the image side of the spacer. The object-side end of the lens barrel is provided with a supporting portion that extends in a direction approaching to the optical axis, and an object-side surface of the first lens is at least partially abutted with the supporting portion. An effective focal length f7 of the seventh lens, an inner diameter d6m of an image-side surface of the sixth spacer, an air interval T67 between the sixth lens and the seventh lens along the optical axis, and a maximum thickness CP6 of the sixth spacer satisfy: $1.0<|d6m/f7|+T67/CP6<8.5$.

By setting spacers between adjacent two lenses, on the one hand, it is beneficial for the adjacent two lenses to stably contact and support the spacers, ensuring the stability of assembly; on the other hand, a spacer may shield light from entering the edge structure portion of the lens on the image side of the spacer, so that the spacer may absorb stray light, so as to reduce the transmission of stray light at the lens edge and improve stray light. By reasonably setting the sixth spacer and reasonably restricting the effective focal length of the seventh lens, the optical back focal distance is within an ideal range, making the total length of the camera module controllable, ensuring the miniaturization and thinness of the camera module, which are conducive to applying the camera module in lightweight products. At the same time, in combination with the inner diameter of the image-side surface of the sixth spacer, the air interval between the sixth lens and the seventh lens along the optical axis, and the maximum thickness of the sixth spacer, the spatial position of the seventh lens along the optical axis may be effectively controlled, so that it does not protrude from the rear end of the lens barrel and avoid scratching of the seventh lens. At the same time, it is beneficial to the stable support between the seventh lens and the sixth spacer and the stable contact between the seventh lens and the internal face of the lens barrel. By closely fitting the spacers and the lenses in the lens barrel while constraining the above parameters, it is beneficial to avoid the ghost image problem between the sixth lens and seventh lens, and to solve the unstable assembly caused by the unreasonable thickness design of the sixth spacer. At the same time, it enables the sixth spacer to effectively intercept the edge light entering the edge structure portion of the seventh lens, thereby to avoid generating internal stray light.

Preferably, the effective focal length f7 of the seventh lens, the inner diameter d6m of the image-side surface of the sixth spacer, the air interval T67 between the sixth lens and the seventh lens along the optical axis, and the maximum thickness CP6 of the sixth spacer satisfy: $1.27 \leq |d6m/f7| + T67/CP6 \leq 8.19$.

It should be noted that the camera module of the present invention is a 7-piece ultra-wide angle, large image plane main lens assembly. Traditional wide-angle lens assemblies generally have a majority of six lenses, with slightly weaker imaging quality. The present disclosure uses seven lenses, which may achieve a field-of-view of more than 140°.

In particular, the first spacer to the sixth spacer include one or more kinds of: spacer ring, septum. In an optional example of the present disclosure, each of the first spacer to the sixth spacer is a septum. In another optional example of the present disclosure, the fifth spacer is a spacer ring, and each of the first spacer to the fourth spacer and the sixth spacer is a septum. In another optional example of the present disclosure, each of the fifth spacer and the sixth spacer is a spacer ring, and each of the first spacer to the fourth spacer is a septum. Whether a spacer ring or a septum is selected may be set according to the interval between the edge structure portions of adjacent two lenses in which it is located. If the interval between the edge structure portions of two adjacent lenses is large, a thicker spacer ring may be set to ensure the assembly strength of adjacent lenses and the spacer ring in the lens barrel, thereby increasing the assembly stability, and thus having a good performance in subsequent reliability verification.

In particular, the camera module also includes a pressing ring, the pressing ring being arranged on the image side of the seventh lens and abutting simultaneously with an image-side surface of the seventh lens and the internal face of the lens barrel. During the assembly process of the camera module of the present disclosure, each lens and spacer are assembled into the lens barrel from the image side end of the lens barrel. On the one hand, the above supporting portion serves as a supporting member to abut and support the object-side surface of the first lens, while limiting the first lens to prevent components in the lens barrel from coming out of the object-side end of the lens barrel. After the components in the lens barrel are assembled, press the pressure ring on the image-side surface of the seventh lens to achieve the assembly of the camera module, thereby ensuring the fixity of the positions of the components in the lens barrel.

In this example, the outer peripheries of the first spacer to the sixth spacer includes one or more kinds of: abutting with a lens, abutting with the internal face of the lens barrel. That is, the outer peripheries of the first spacer to the sixth spacer may all abut with the internal face of the lens barrel; or each of them may abut with a lens; or one part thereof abuts with the internal face of the lens barrel, and the other part thereof abuts with a lens. When an outer periphery of a spacer abuts a lens, two adjacent lenses adjacent with the spacer are snap-fitted, the spacer is located at a position where the two adjacent lenses are snap-fitted, and the outer periphery of the spacer abuts a lens located on the object side in the two adjacent lenses.

In this example, a radius of curvature R2 of an image-side surface of the first lens, a radius of curvature R3 of an object-side surface of the second lens, an outer diameter D1s of an object-side surface of the first spacer, an outer diameter D1m of an image-side surface of the first spacer, an inner diameter d1s of the object-side surface of the first spacer, and an inner diameter dim of the image-side surface of the first spacer satisfy: $24.0 < R2*(D1s-d1s)/(R3*(D1m-d1m)) < 56.0$. By controlling the radius of curvature of the image-side surface of the first lens and the radius of curvature of the object-side surface of the second lens, the degrees of curvatures of the two lenses may be controlled, making the minimum distance between the two lenses controllable and avoiding interference during assembly. At the same time, by matching the inner and outer diameter parameter settings of the first spacer, the outer diameter gradient between the two lenses is controllable, thereby increasing assembly stability. At the same time, a reasonable inner diameter setting may absorb most of the internally reflected stray light from the first lens, thereby reducing the stray light generated by the edges. Preferably, $24.32 \leq R2*(D1s-d1s)/(R3*(D1m-d1m)) \leq 55.54$.

In this example, an effective focal length f1 of the first lens, an outer diameter D1s of an object-side surface of the first spacer, a maximum thickness CP1 of the first spacer, and an air interval T12 between the first lens and the second lens along the optical axis satisfy: $13.0 < f1/D1s + T12/CP1 < 23.0$. By controlling the effective focal length of the first lens, the light convergence ability of the first lens may be improved, and the light incidence angle may be improved. At the same time, in combination with the outer diameter of the object-side surface of the first spacer, the maximum thickness of the first spacer, and the parameter of the air interval between the first lens and the second lens along the optical axis, the camera module may be made to have no whitening when viewed from the sky, and the first spacer may be used to cover the edge structure portion of the lens. At the same time, it allows the air interval herein to be kept in an ideal position to reduce sensitivity, which is beneficial for improving reliability performance. Preferably, $13.70 \leq f1/D1s + T12/CP1 \leq 22.27$.

In this example, an effective focal length f2 of the second lens, an inner diameter d1m of an image-side surface of the first spacer, and an inner diameter d2s of an object-side surface of the second spacer satisfy: $6.0 < f2/(d1m-d2s) < 9.0$. By controlling the effective focal length of the second lens, the convergence degree of the edge field of view curve may be controlled here, thereby improving the overall light intake and the brightness of the imaging plane. At the same time, in combination with the inner diameter parameter of the first spacer and the second spacer, the stray light emitted into the edge structure portion of the second lens and the stray light emitted from the edge structure portion of the second lens may be blocked, thereby reducing the invalid light spots on the imaging plane. Preferably, $6.11 \leq f2/(d1m-d2s) \leq 8.92$.

In this example, an effective focal length f1 of the first lens, an effective focal length f2 of the second lens, an air interval T12 between the first lens and the second lens along the optical axis, an air interval T34 between the third lens and the fourth lens along the optical axis, a maximum thickness CP1 of the first spacer, and a maximum thickness CP2 of the second spacer satisfy: $-13.0 < f2*(T12+CP1)/(f1*(T34+CP2)) < -6.5$. Reasonably setting the effective focal lengths of the first and second lenses may also converge the light at the edge of the field-of-view to the optical axis as much as possible, thereby reducing the loss of illumination.

At the same time, the coordinated adjustment of the parameters of T12, T34, and the maximum thicknesses of the first spacer and the second spacer allows for more sufficient transmission distance of light in the axial direction, providing greater freedom in lens surface design, which is beneficial to improving the overall pixel. Preferably, $-12.34 \le f2*(T12+CP1)/(f1*(T34+CP2)) \le -6.80$.

In this example, an effective focal length f3 of the third lens, a center thickness CT3 of the third lens along the optical axis, an interval EP23 between the second spacer and the third spacer, and a maximum thickness CP3 of the third spacer satisfy: $24.0 < f3/CT3+f3/(EP23+CP3) < 38.0$. By constraining the ratio of the effective focal length to the center thickness of the third lens, the contribution of the third lens to the system's coma may be controlled, and the coma generated by the front-end components may be effectively compensated to achieve good imaging quality. At the same time, in combination with the distance between the second spacer and the third spacer and the maximum thickness of the third spacer, the edge thickness of the third lens may be kept in a reasonable state, which is conducive to mold processing and lens molding of the third lens. Preferably, $24.47 \le f3/CT3+f3/(EP23+CP3) \le 37.35$.

In this example, a radius of curvature R5 of an object-side surface of the third lens, an outer diameter D3s of an object-side surface of the third spacer, an outer diameter D2m of an image-side surface of the second spacer, an inner diameter d2m of an image-side surface of the second spacer, and an inner diameter d3s of an object-side surface of the third spacer satisfy: $11.0 < R5/|D3s-D2m|+R5/(d2m-d3s) < 67.0$. By reasonably controlling the ratio of the radius of curvature of the object-side surface of the third lens to the inner and outer diameter deviations of the second spacer and the ratio of the radius of curvature of the object-side surface of the third lens to the inner and outer diameter deviations of the third spacer, it is beneficial to ensure that the third lens has a suitable refractive power, while reducing the angle between the main light and the optical axis when it enters the imaging plane, thereby improving the illuminance of the imaging plane. While reducing light, it may make the edge structure portions of the lenses have more sufficient layout space, which is conducive to optimizing stray light removal. Preferably, $11.92 \le R5/|D3s-D2m|+R5/(d2m-d3s) \le 66.62$.

In this example, an effective focal length f4 of the fourth lens, a center thickness CT4 of the fourth lens along the optical axis, an inner diameter d4s of an object-side surface of the fourth spacer, an inner diameter d3m of an image-side surface of the third spacer, and an interval EP34 between the third spacer and the fourth spacer satisfy: $6.0 < f4/CT4+(d4s-d3m)/EP34 < 7.5$. Reasonably controlling the ratio of the effective focal length of the fourth lens to the center thickness of the fourth lens may ensure a small angle between the main light and the optical axis when main light is incident, and it is also beneficial for the fourth lens to have better workability. In combination with the inner diameters and distance parameters of the third and fourth spacers, it may reduce the generation of edge stray light, so that unnecessary light is absorbed when hitting the spacers. Preferably, $6.14 \le f4/CT4+(d4s-d3m)/EP34 \le 7.46$.

In this example, an air interval T45 between the fourth lens and the fifth lens along the optical axis, a maximum thickness CP4 of the fourth spacer, an outer diameter D4s of an object-side surface of the fourth spacer, and a radius of curvature R8 of an image-side surface of the fourth lens satisfy: $9.0 < T45/CP4+D4s/R8 < 24.0$. By satisfying the above conditions, the T45 may be controlled to be in a reasonable position, so that the system has enough interval space, so that the lens surface changes with higher freedom, so as to improve the camera module's ability to correct astigmatic and field curvature. At the same time, controlling the ratio of the outer diameter of the fourth spacer to the radius of curvature of the fourth lens is beneficial to controlling the degree of curvature of the fourth lens. Under the premise of ensuring that the main light is controllable, it is necessary to make the lens shape as smooth as possible, which is beneficial to reducing the appearance of weld marks, water ripples, etc. Preferably, $9.17 \le T45/CP4+D4s/R8 \le 23.32$.

In this example, an effective focal length f5 of the fifth lens, a center thickness CT5 of the fifth lens along the optical axis, an air interval T56 between the fifth lens and the sixth lens along the optical axis, an interval EP45 between the fourth spacer and the fifth spacer, and a maximum thickness CP5 of the fifth spacer satisfy: $-34.0 < f5/(CT5+T56)+f5/(EP45+CP5) < -17.0$. By controlling the above parameters of the fifth lens, the radial distribution of the fifth lens may be made less curved, and significant deformation is not easy to occur during assembly and support. At the same time, the thickness of T56 and the fifth spacer control the transition between the edge structure portion of the lens and the effective part in the middle is smoother, which is not prone to reverse curvature. At the same time, it may avoid stray light reflected by the IR sheet to the object-side surface support position of the fifth lens. Preferably, $-33.43 \le f5/(CT5+T56)+f5/(EP45+CP5) \le -17.45$.

In this example, a radius of curvature R9 of an object-side surface of the fifth lens, a radius of curvature R10 of an image-side surface of the fifth lens, an outer diameter D5s of an object-side surface of the fifth spacer, and an inner diameter d5s of an object-side surface of the fifth spacer satisfy: $1.5 < |R9/R10|*(D5s/d5s) < 10.0$. By controlling the inner and outer diameters of the fifth spacer, a relatively ideal annular zone area may be obtained, which is less prone to deformation and defects in high temperature and high humidity reliability experiments. At the same time, a reasonable inner diameter setting may absorb most of the internal reflected stray light of the fifth lens, reduce invalid light spots. At the same time, in combination with the parameter of the radius of curvature of the fifth lens is beneficial to reducing the refractive power of the lenses close to the image side in the camera module, thereby providing a better ability to compensate chromatic aberration and distortion. Preferably, $1.90 \le |R9/R10|*(D5s/d5s) \le 9.45$.

In this example, an effective focal length f5 of the fifth lens, an effective focal length f6 of the sixth lens, an outer diameter Dos of an object-side surface of the sixth spacer, and an outer diameter D5m of an image-side surface of the fifth spacer satisfy: $-6.5 < (f5+f6)/(D6s-D5m) < -2.0$. By reasonably allocating the focal lengths of the fifth lens and sixth lens, and controlling the refractive power of the rear section of the system to a small range, the deflection angle of light may be reduced, thereby reducing the sensitivity of the system. At the same time, the outer diameters of the fifth spacer and sixth spacer are controlled to minimize the assembly section difference in the rear half, and auxiliary supports are used to enhance stability. Preferably, $-6.05 \le (f5+f6)/(D6s-D5m) \le -2.38$.

In this example, an effective focal length f6 of the sixth lens, a center thickness CT6 of the sixth lens along the optical axis, and an interval EP56 between the fifth spacer and the sixth spacer satisfy: $5.0 < f6/EP56+f6/CT6 < 8.0$. By controlling the effective focal length of the sixth lens and the center thickness of the sixth lens along the optical axis, the diameter to thickness ratio parameter of the sixth lens may be controlled within a reasonable range. For large lenses, it is beneficial to lens molding and reduces stress residue and poor appearance. At the same time, it is combined with spacing control to maintain a safe distance between the sixth lens and the seventh lens, thereby reducing interference of light. Preferably, $5.33 \le f6/EP56 + f6/CT6 \le 7.95$.

In this example, half of a maximum field-of-view Semi-FOV of the camera module, an effective focal length f7 of the seventh lens, and an inner diameter d6s of an object-side surface of the sixth spacer satisfy: $4.0 < \mathrm{Tan(Semi\text{-}FOV)} + |d6s/f7| < 5.5$. By controlling the maximum field-of-view and the effective focal length of the seventh lens, the system may have ultra-wide angle characteristics and achieve a shorter back focal distance for the entire camera module. When cooperating with a module, it may have a smaller module height, which is convenient to cooperate with multiple models. At the same time, reasonably controlling the field-of-view may ensure that the light beam in the object space may be imaged in the angular range of the chip image plane after passing through the optical system, thereby making the imaging pixels on the image plane higher. Controlling d6s is beneficial for avoiding stray light that occurs when it is irradiated on the metal spacer. Preferably, $4.70 \le \mathrm{Tan(Semi\text{-}FOV)} + |d6s/f7| \le 5.13$.

Optionally, the above camera module may further include a protective glass for protecting the photosensitive element located on an imaging plane.

The camera module in the present disclosure may employ a plurality of lenses, such as seven lenses as described above. In the present disclosure, at least one of the surfaces of lenses is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the camera module may be varied to achieve the various results and advantages described in this specification without departing from the technical solution claimed by the present disclosure. For example, although the embodiment is described by taking seven lenses as an example, the camera module is not limited to include seven lenses. The camera module may also include other numbers of lenses if desired.

FIG. 1 shows a schematic structural view of a camera module according to the present disclosure, wherein the parameters D1s, d5s, d1s, d4s, d1m, d6s, D6s, D1m, EP12, L, CP1, CP2, and the like are marked in FIG. 1 to clearly and intuitively understand the meaning of the parameters. In order to facilitate describing the imaging module and the specific surface type, these parameters will not be reflected in the accompanying drawings when specific examples are explained later.

Some examples of specific surface types and parameters of the camera module applicable to the above embodiment will be further described below with reference to the accompanying drawings.

It should be noted that in the following example, there are first state and second state, and in a same example, the parameters such as the radius of curvature and center thickness of the first lens to the seventh lens of the camera module, as well as the spaced interval and higher order coefficient between lenses in the first state and the second state, are the same, but the parameters of the thickness, inner diameter, and outer diameter of the lens barrel, the first spacer to the sixth spacer, as well as the shape of some lenses, are different. In other words, the main structures used for imaging are the same, while the auxiliary structures used for imaging are different.

It should be noted that any one of the following examples 1 to 4 is applicable to all examples of the present disclosure.

Example 1

Figure 3:
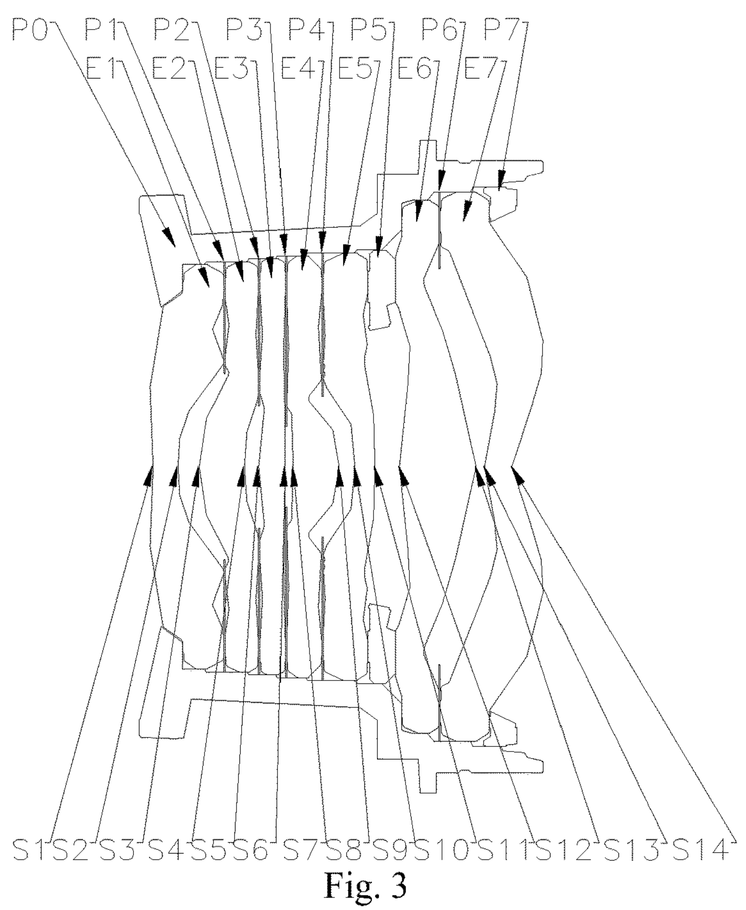
FIG. 3 shows a schematic structural view of a camera module in a first state of example 1 of the present invention.
Figure 4:
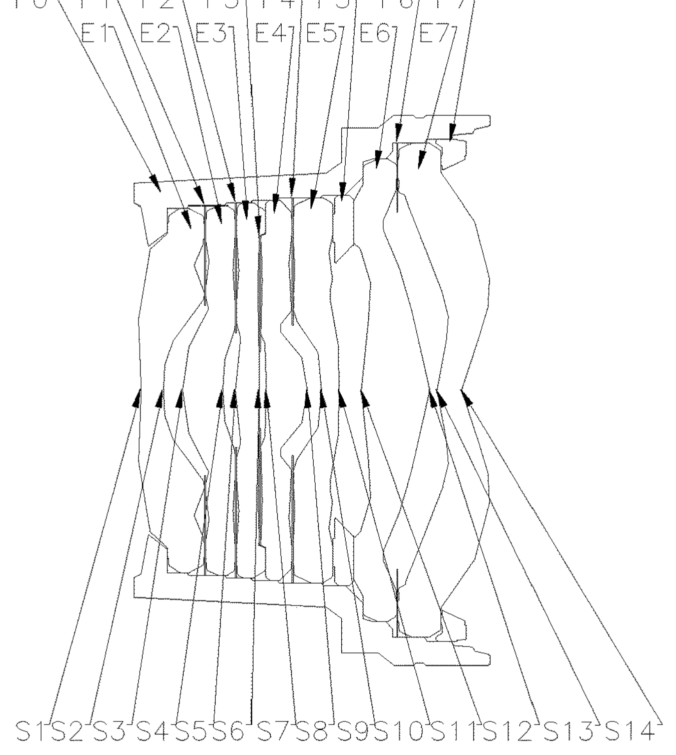
FIG. 4 shows a schematic structural view of a camera module in a second state of example 1 of the present invention.

As shown in FIG. 3 to FIG. 6, a camera module of example 1 is described. FIG. 3 shows a schematic structural view of the camera module of example 1 in a first state. FIG. 4 shows a schematic structural view of the camera module of example 1 in a second state.

As shown in FIG. 3 to FIG. 4, the camera module includes a lens barrel P0 and a first lens E1, a first spacer P1, a second lens E2, a second spacer P2, a third lens E3, a third spacer P3, a fourth lens E4, a fourth spacer P4, a fifth lens E5, a fifth spacer P5, a sixth lens E6, a sixth spacer P6, a seventh lens E7 and a pressing ring P7, which are sequentially arranged along an optical axis of the lens barrel P0 from an object side to an image side in the lens barrel P0. An object-side end of the lens barrel P0 is provided with a supporting portion 10, and an object-side surface S1 of the first lens is at least partially abutted with the supporting portion 10.

In example 1, the first spacer P1 to the fourth spacer P4 and the sixth spacer P6 are septa, and the fifth spacer P5 is a spacer ring.

As shown in FIG. 3, in the first state of the camera module, an object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. An object-side surface and an image-side surface of the third spacer P3 abut at least partially with an image-side surface S6 of the third lens and an object-side surface S7 of the fourth lens, respectively, and an outer periphery of the third spacer P3 abuts with the internal face of the lens barrel P0. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

As shown in FIG. 4, in the second state of the camera module, an object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. The third lens E3 and the fourth lens E4 are snap-fitted, and the third spacer P3 is located at the position where the third lens E3 and the fourth lens E4 are snap-fitted, so that an object-side surface and an image-side surface of the third spacer P3 abut at least partially with an image-side surface S6 of the third lens and an object-side surface S7 of the fourth lens, respectively, and an outer periphery of the third spacer P3 abuts with the third lens E3. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

In view of above, the parameters of the camera module in example 1 in the first state 1-1 and the second state 1-2 are shown in Table 1.

TABLE 1

| Parameter | State 1-1 | State 1-2 |
|---|---|---|
| D1s (mm) | 7.160 | 7.260 |
| d1s (mm) | 3.252 | 3.352 |
| D1m (mm) | 7.160 | 7.260 |
| d1m (mm) | 3.252 | 3.352 |
| CP1 (mm) | 0.018 | 0.022 |
| d2s (mm) | 2.146 | 2.246 |
| CP2 (mm) | 0.018 | 0.018 |
| CP3 (mm) | 0.022 | 0.022 |
| EP23 (mm) | 0.437 | 0.436 |
| D3s (mm) | 7.360 | 6.083 |
| D2m (mm) | 7.260 | 7.360 |
| d2m (mm) | 2.146 | 2.246 |
| d3s (mm) | 1.403 | 1.503 |
| d4s (mm) | 2.460 | 2.560 |
| d3m (mm) | 1.403 | 1.503 |
| EP34 (mm) | 0.615 | 0.616 |
| CP4 (mm) | 0.022 | 0.022 |
| D4s (mm) | 7.460 | 7.560 |
| EP45 (mm) | 0.786 | 0.786 |
| CP5 (mm) | 0.485 | 0.405 |
| D5s (mm) | 7.401 | 7.501 |
| d5s (mm) | 4.772 | 4.993 |
| D6s (mm) | 9.600 | 9.700 |
| D5m (mm) | 7.219 | 7.479 |
| EP56 (mm) | 0.764 | 0.844 |
| CP6 (mm) | 0.022 | 0.022 |
| d6s (mm) | 6.906 | 7.006 |
| d6m (mm) | 6.906 | 7.006 |

In example 1, an object-side surface S1 of the first lens is concave, and an image-side surface S2 of the first lens is concave. An object-side surface S3 of the second lens is convex, and an image-side surface S4 of the second lens is concave. An object-side surface S5 of the third lens is convex, and an image-side surface S6 of the third lens is convex. An object-side surface S7 of the fourth lens is concave, and an image-side surface S8 of the fourth lens is convex. An object-side surface S9 of the fifth lens is concave, and an image-side surface S10 of the fifth lens is concave. An object-side surface S11 of the sixth lens is convex, and an image-side surface S12 of the sixth lens is convex. An object-side surface S13 of the seventh lens is convex, and an image-side surface S14 of the seventh lens is concave.

In example 1, a focal length f of the camera module is 2.43 mm, a focal length f1 of the first lens is −3.56 mm, a focal length f2 of the second lens is 9.86 mm, a focal length f3 of the third lens is 8.09 mm, a focal length f4 of the fourth lens is 4.33 mm, a focal length f5 of the fifth lens is −8.44 mm, a focal length f6 of the sixth lens is 2.76 mm, and half of a maximum field-of-view Semi-FOV of the camera module is 73.7°.

Table 2 is a table illustrating basic structural parameters of the camera module of example 1, wherein the units for the radius of curvature and the thickness/distance are millimeter (mm).

TABLE 2

| Surface number | Surface type | Radius of curvature | Thickness | Material: Refractive index | Material: Abbe number | Conic coefficient |
|---|---|---|---|---|---|---|
| OBJ | Spherical | Infinite | Infinite | | | |
| S1 | Aspheric | −2.3158 | 0.4366 | 1.54 | 55.6 | −1.3450 |
| S2 | Aspheric | 11.7396 | 0.3732 | | | −0.6123 |
| S3 | Aspheric | 3.2284 | 0.7890 | 1.62 | 25.9 | −0.5411 |
| S4 | Aspheric | 6.2084 | 0.2497 | | | −0.8604 |
| S5 | Aspheric | 5.8715 | 0.4541 | 1.54 | 56.1 | −23.0365 |
| S6 | Aspheric | −17.3188 | 0.0013 | | | 0.0000 |
| STO | Spherical | Infinite | 0.1400 | | | |

TABLE 2-continued

| Surface number | Surface type | Radius of curvature | Thickness | Material: Refractive index | Material: Abbe number | Conic coefficient |
|---|---|---|---|---|---|---|
| S7 | Aspheric | −45.1604 | 0.8045 | 1.54 | 56.1 | −66.6987 |
| S8 | Aspheric | −2.2618 | 0.2753 | | | −0.8434 |
| S9 | Aspheric | −13.0267 | 0.3500 | 1.67 | 19.2 | −1.0785 |
| S10 | Aspheric | 10.2976 | 0.4303 | | | −26.7078 |
| S11 | Aspheric | 5.4486 | 1.3433 | 1.54 | 56.1 | −1.0000 |
| S12 | Aspheric | −1.9050 | 0.1439 | | | −1.5535 |
| S13 | Aspheric | 1.6602 | 0.4800 | 1.66 | 20.4 | −2.0133 |
| S14 | Aspheric | 0.9254 | 0.8933 | | | −1.3610 |
| S15 | Spherical | Infinite | 0.2100 | 1.52 | 64.2 | |
| S16 | Spherical | Infinite | 0.4000 | | | |
| S17 | Spherical | Infinite | | | | |

In example 1, the object-side surface and the image-side surface of the first lens E1 to the seventh lens E7 are all aspheric. The surface shape of each aspheric lens may be defined by using, but not limited to, the following aspheric formula:

$$x = \frac{ch^2}{1 + \sqrt{1 - (k+1)c^2h^2}} + \sum Aih^i \quad \text{Formula (1)}$$

Where, x is the sag—the axis-component of the displacement of the surface from the aspheric vertex, when the surface is at height h from the optical axis; c is a paraxial curvature of the aspheric surface, c=1/R that is, the paraxial curvature c is reciprocal of the radius of curvature R in the above Table 1; k is a conic coefficient; Ai is a correction coefficient for the i-th order of the aspheric surface. Table 3 below shows high-order coefficients A4, A6, A8, A10, A12, A14, A16, A18, A20, A22, A24, A26, A28, and A30 applicable to each aspheric surface S1 to S14 in example 1.

TABLE 3

| Surface number | A4 | A6 | A8 | A10 | A12 | A14 | A16 |
|---|---|---|---|---|---|---|---|
| S1 | 3.1054E−01 | −3.4452E−01 | 3.2187E−01 | −2.3582E−01 | 1.3126E−01 | −5.4991E−02 | 1.7295E−02 |
| S2 | 3.0403E−01 | 4.5775E−03 | −1.3304E+00 | 4.2684E+00 | −7.9323E+00 | 9.9396E+00 | −8.7945E+00 |
| S3 | 4.9541E−02 | −1.3262E−01 | 2.6282E−01 | −7.3991E−02 | −1.0064E+00 | 3.0541E+00 | −4.8990E+00 |
| S4 | 6.8019E−02 | 7.9673E−02 | −3.6224E−01 | 1.6316E+00 | −4.1073E+00 | 6.0398E+00 | −5.1719E+00 |
| S5 | 1.0486E−01 | −4.9620E−01 | 3.1547E+00 | −1.2338E+01 | 2.9697E+01 | −4.3626E+01 | 3.4921E+01 |
| S6 | 7.0244E−03 | 4.9216E−01 | −8.5647E+00 | 7.9849E+01 | −4.4477E+02 | 1.5606E+03 | −3.4857E+03 |
| S7 | 4.0409E−02 | −2.7322E+00 | 5.5875E+01 | −6.4358E+02 | 4.7177E+03 | −2.3553E+04 | 8.3133E+04 |
| S8 | 4.2220E−02 | −2.8178E+00 | 2.7381E+01 | −1.6942E+02 | 7.1670E+02 | −2.1586E+03 | 4.7368E+03 |
| S9 | −2.1457E−01 | 2.5409E−01 | −1.8136E+00 | 1.1040E+01 | −4.1709E+01 | 1.0545E+02 | −1.8654E+02 |
| S10 | −9.9498E−02 | −2.1666E−01 | 9.4015E−01 | −2.0175E+00 | 3.0024E+00 | −3.2349E+00 | 2.5517E+00 |
| S11 | 6.1578E−02 | −1.7574E−01 | 2.5587E−01 | −2.6313E−01 | 1.9159E−01 | −9.9410E−02 | 3.7205E−02 |
| S12 | 1.8198E−01 | −2.5465E−01 | 2.8919E−01 | −2.2359E−01 | 1.1510E−01 | −4.0608E−02 | 1.0099E−02 |
| S13 | −5.7946E−02 | −1.4870E−01 | 2.1874E−01 | −1.5395E−01 | 6.6193E−02 | −1.8923E−02 | 3.7594E−03 |
| S14 | −2.9679E−01 | 1.8845E−01 | −8.0931E−02 | 2.3671E−02 | −4.8192E−03 | 6.8916E−04 | −6.7783E−05 |

| Surface number | A18 | A20 | A22 | A24 | A26 | A28 | A30 |
|---|---|---|---|---|---|---|---|
| S1 | −4.0703E−03 | 7.1118E−04 | −9.0755E−05 | 8.2072E−06 | −4.9781E−07 | 1.8154E−08 | −3.0080E−10 |
| S2 | 5.5933E+00 | −2.5638E+00 | 8.3771E−01 | −1.8980E−01 | 2.8238E−02 | −2.4706E−03 | 9.5805E−05 |
| S3 | 5.0977E+00 | −3.6362E+00 | 1.7994E+00 | −6.0857E−01 | 1.3433E−01 | −1.7441E−02 | 1.0097E−03 |
| S4 | 2.3049E+00 | −3.7250E−01 | −2.1635E−02 | 0.0000E+00 | 0.0000E+00 | 0.0000E+00 | 0.0000E+00 |
| S5 | −6.8362E+00 | −1.2798E+01 | 1.1255E+01 | −3.0105E+00 | 0.0000E+00 | 0.0000E+00 | 0.0000E+00 |
| S6 | 4.8134E+03 | −3.7477E+03 | 1.2587E+03 | 0.0000E+00 | 0.0000E+00 | 0.0000E+00 | 0.0000E+00 |
| S7 | −2.1141E+05 | 3.8922E+05 | −5.1422E+05 | 4.7525E+05 | −2.9167E+05 | 1.0675E+05 | −1.7628E+04 |
| S8 | −7.6540E+03 | 9.1031E+03 | −7.8696E+03 | 4.8067E+03 | −1.9645E+03 | 4.8154E+02 | −5.3476E+01 |
| S9 | 2.3569E+02 | −2.1403E+02 | 1.3870E+02 | −6.2615E+01 | 1.8713E+01 | −3.3270E+00 | 2.6623E−01 |
| S10 | −1.4823E+00 | 6.3385E−01 | −1.9740E−01 | 4.3607E−02 | −6.4797E−03 | 5.8096E−04 | −2.3745E−05 |
| S11 | −1.0125E−02 | 2.0025E−03 | −2.8459E−04 | 2.8293E−05 | −1.8665E−06 | 7.3372E−08 | −1.3003E−09 |
| S12 | −1.8001E−03 | 2.3094E−04 | −2.1134E−05 | 1.3447E−06 | −5.6472E−08 | 1.4062E−09 | −1.5720E−11 |
| S13 | −5.3111E−04 | 5.3763E−05 | −3.8743E−06 | 1.9411E−07 | −6.4279E−09 | 1.2651E−10 | −1.1208E−12 |
| S14 | 4.2009E−06 | −1.0728E−07 | −6.1203E−09 | 7.2754E−10 | −3.2238E−11 | 7.1858E−13 | −6.6491E−15 |

FIG. 5 illustrates longitudinal aberration curves of the camera module according to example 1, representing the deviations of focal points converged by light of different wavelengths after passing through the camera module. FIG. 6 illustrates a lateral color curve of the camera module according to example 1, representing the deviations of different image heights on an imaging plane after light passes through the camera module.

It can be seen from FIG. 5 and FIG. 6 that the camera module provided in example 1 may achieve good image quality.

Example 2

As shown in FIG. 7 to FIG. 10, a camera module of example 2 is described. FIG. 7 shows a schematic structural view of the camera module of example 2 in a first state. FIG. 8 shows a schematic structural view of the camera module of example 2 in a second state.

As shown in FIG. 7 to FIG. 8, the camera module includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5, a sixth lens E6, a sixth spacer P6, a seventh lens E7 and a pressing ring P7, which are sequentially arranged in the lens barrel P0 along an optical axis of the lens barrel P0 from an object side to an image side. An object-side end of the lens barrel P0 is provided with a supporting portion 10, and an object-side surface S1 of the first lens is at least partially abutted with the supporting portion 10.

As shown in FIG. 7, in the first state of the camera module, the first spacer P1 to the sixth spacer P6 are septa. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. An object-side surface and an image-side surface of the third spacer P3 abut at least partially with an image-side surface S6 of the third lens and an object-side surface S7 of the fourth lens, respectively, and an outer periphery of the third spacer P3 abuts with the internal face of the lens barrel P0. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

As shown in FIG. 8, in the second state of the camera module, the first spacer P1 to the fifth spacer P5 are septa, and the sixth spacer P6 is a spacer ring. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. The third lens E3 and the fourth lens E4 are arranged as being snap-fitted, and the third spacer P3 is located at the position where the third lens E3 and the fourth lens E4 are snap-fitted, so that an object-side surface and an image-side surface of the third spacer P3 abut at least partially with an image-side surface S6 of the third lens and an object-side surface S7 of the fourth lens, respectively, and an outer periphery of the third spacer P3 abuts with the third lens E3. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

In view of the above, the parameters of the camera module in example 2 in the first state 2-1 and the second state 2-2 are shown in Table 4.

TABLE 4

| Parameter | State | |
|---|---|---|
| | 2-1 | 2-2 |
| D1s (mm) | 7.319 | 7.419 |
| d1s (mm) | 3.183 | 3.283 |
| D1m (mm) | 7.319 | 7.419 |
| d1m (mm) | 3.183 | 3.283 |
| CP1 (mm) | 0.030 | 0.030 |
| d2s (mm) | 1.969 | 2.069 |
| CP2 (mm) | 0.019 | 0.019 |
| CP3 (mm) | 0.033 | 0.033 |
| EP23 (mm) | 0.372 | 0.373 |
| D3s (mm) | 7.519 | 6.183 |
| D2m (mm) | 7.419 | 7.519 |
| d2m (mm) | 1.969 | 2.069 |
| d3s (mm) | 1.502 | 1.602 |
| d4s (mm) | 2.243 | 2.343 |
| d3m (mm) | 1.502 | 1.602 |
| EP34 (mm) | 0.496 | 0.495 |
| CP4 (mm) | 0.012 | 0.012 |
| D4s (mm) | 7.619 | 7.719 |
| EP45 (mm) | 0.959 | 0.959 |
| CP5 (mm) | 0.033 | 0.033 |
| D5s (mm) | 8.910 | 9.010 |
| d5s (mm) | 3.941 | 4.041 |
| D6s (mm) | 9.866 | 9.896 |
| D5m (mm) | 8.910 | 9.010 |
| EP56 (mm) | 0.876 | 0.765 |

TABLE 4-continued

| Parameter | State 2-1 | State 2-2 |
|---|---|---|
| CP6 (mm) | 0.018 | 0.264 |
| d6s (mm) | 6.262 | 6.451 |
| d6m (mm) | 6.262 | 6.451 |

In example 2, an object-side surface S1 of the first lens is concave, and an image-side surface S2 of the first lens is concave. An object-side surface S3 of the second lens is convex, and an image-side surface S4 of the second lens is concave. An object-side surface S5 of the third lens is convex, and an image-side surface S6 of the third lens is convex. An object-side surface S7 of the fourth lens is convex, and an image-side surface S8 of the fourth lens is convex. An object-side surface S9 of the fifth lens is concave, and an image-side surface S10 of the fifth lens is concave. An object-side surface S11 of the sixth lens is convex, and an image-side surface S12 of the sixth lens is convex. An object-side surface S13 of the seventh lens is convex, and an image-side surface S14 of the seventh lens is concave.

In example 2, a focal length f of the camera module is 2.43 mm, a focal length f1 of the first lens is −2.96 mm, a focal length f2 of the second lens is 7.42 mm, a focal length f3 of the third lens is 8.26 mm, a focal length f4 of the fourth lens is 3.60 mm, a focal length f5 of the fifth lens is −8.48 mm, a focal length f6 of the sixth lens is 3.12 mm, and half of a maximum field-of-view Semi-FOV of the camera module is 75.1°.

Table 5 is a table illustrating basic structural parameters of the camera module of example 2, wherein the units for the radius of curvature and the thickness/distance are millimeter (mm).

TABLE 5

| Surface number | Surface type | Radius of curvature | Thickness | Material: Refractive index | Material: Abbe number | Conic coefficient |
|---|---|---|---|---|---|---|
| OBJ | Spherical | Infinite | Infinite | | | |
| S1 | Aspheric | −2.8287 | 0.4344 | 1.54 | 55.6 | −5.9045 |
| S2 | Aspheric | 3.8192 | 0.4230 | | | −3.8892 |
| S3 | Aspheric | 2.6857 | 0.7650 | 1.62 | 25.9 | −2.1404 |
| S4 | Aspheric | 5.7531 | 0.2138 | | | 17.9152 |
| S5 | Aspheric | 4.6430 | 0.4874 | 1.54 | 56.1 | −3.2712 |
| S6 | Aspheric | −153.3514 | 0.0111 | | | 0.0000 |
| STO | Spherical | Infinite | 0.0811 | | | |
| S7 | Aspheric | 25.2470 | 0.7713 | 1.54 | 56.1 | 0.0000 |
| S8 | Aspheric | −2.1081 | 0.2981 | | | −0.5232 |
| S9 | Aspheric | −12.7921 | 0.3509 | 1.67 | 19.2 | 54.6271 |
| S10 | Aspheric | 10.5368 | 0.3418 | | | −96.2909 |
| S11 | Aspheric | 11.5272 | 1.3786 | 1.54 | 56.1 | 6.8114 |
| S12 | Aspheric | −1.9124 | 0.0781 | | | −0.8668 |
| S13 | Aspheric | 1.7748 | 0.5300 | 1.66 | 20.4 | −0.9405 |
| S14 | Aspheric | 1.0029 | 0.8869 | | | −0.9966 |
| S15 | Spherical | Infinite | 0.2100 | 1.52 | 64.2 | |
| S16 | Spherical | Infinite | 0.4000 | | | |
| S17 | Spherical | Infinite | | | | |

Table 6 shows high-order coefficients applicable to each aspheric surface in example 2, wherein the surface shape of each aspheric surface may be defined by the formula (1) given in the above example 1.

TABLE 6

| Surface number | A4 | A6 | A8 | A10 | A12 | A14 | A16 |
|---|---|---|---|---|---|---|---|
| S1 | 2.6653E−01 | −3.1945E−01 | 3.0467E−01 | −2.2578E−01 | 1.2728E−01 | −5.4208E−02 | 1.7402E−02 |
| S2 | 2.7040E−01 | 1.9718E−01 | −2.3674E+00 | 7.9273E+00 | −1.6610E+01 | 2.4068E+01 | −2.4947E+01 |
| S3 | 6.6764E−04 | 1.1090E−01 | −6.8615E−01 | 2.3050E+00 | −5.0298E+00 | 7.7924E+00 | −8.8817E+00 |
| S4 | 1.0001E−01 | −3.4099E−01 | 2.9317E+00 | −9.6285E+00 | −4.0077E+00 | 1.7666E+02 | −8.1251E+02 |
| S5 | 6.3151E−02 | 2.3891E−01 | −2.1545E+00 | 1.4086E+01 | −6.0767E+01 | 1.7513E+02 | −3.4018E+02 |
| S6 | 8.9249E−03 | 7.0544E−01 | −1.3506E+01 | 1.3736E+02 | −8.2939E+02 | 3.1177E+03 | −7.3656E+03 |
| S7 | 6.6257E−03 | −2.5793E−01 | 2.5146E+00 | −1.7044E+01 | 6.9794E+01 | −1.6176E+02 | 1.2235E+02 |
| S8 | −4.0739E−02 | −1.2364E+00 | 1.3524E+01 | −9.9132E+01 | 4.9716E+02 | −1.7586E+03 | 4.4775E+03 |
| S9 | −1.4492E−01 | 4.6469E−01 | −5.0128E+00 | 2.7714E+01 | −9.7285E+01 | 2.3451E+02 | −4.0218E+02 |
| S10 | 7.3830E−03 | −2.7766E−01 | 6.2189E−01 | −8.8695E−01 | 9.4226E−01 | −7.7851E−01 | 5.0646E−01 |
| S11 | 9.0505E−02 | −2.0209E−01 | 2.5936E−01 | −2.3795E−01 | 1.5652E−01 | −7.3582E−02 | 2.4664E−02 |
| S12 | 1.7278E−01 | −2.7050E−01 | 3.2558E−01 | −2.5202E−01 | 1.2721E−01 | −4.2764E−02 | 9.5299E−03 |
| S13 | −6.7045E−02 | −1.7329E−01 | 2.4597E−01 | −1.7198E−01 | 7.5299E−02 | −2.2332E−02 | 4.6626E−03 |
| S14 | −2.9932E−01 | 1.4499E−01 | −4.8319E−02 | 9.6063E−03 | −7.4150E−04 | −1.4935E−04 | 5.7348E−05 |
| S1 | 2.6653E−01 | −3.1945E−01 | 3.0467E−01 | −2.2578E−01 | 1.2728E−01 | −5.4208E−02 | 1.7402E−02 |

TABLE 6-continued

| Surface number | A18 | A20 | A22 | A24 | A26 | A28 | A30 |
|---|---|---|---|---|---|---|---|
| S1 | −4.1962E−03 | 7.5372E−04 | −9.9167E−05 | 9.2694E−06 | −5.8239E−07 | 2.2041E−08 | −3.7957E−10 |
| S2 | 1.8743E+01 | −1.0215E+01 | 3.9923E+00 | −1.0893E+00 | 1.9682E−01 | −2.1143E−02 | 1.0216E−03 |
| S3 | 7.5326E+00 | −4.7292E+00 | 2.1556E+00 | −6.8840E−01 | 1.4495E−01 | −1.7943E−02 | 9.8215E−04 |
| S4 | 2.0921E+03 | −3.5031E+03 | 3.9553E+03 | −2.9919E+03 | 1.4529E+03 | −4.0898E+02 | 5.0690E+01 |
| S5 | 4.3869E+02 | −3.5892E+02 | 1.6790E+02 | −3.4029E+01 | 0.0000E+00 | 0.0000E+00 | 0.0000E+00 |
| S6 | 1.0631E+04 | −8.5620E+03 | 2.9482E+03 | 0.0000E+00 | 0.0000E+00 | 0.0000E+00 | 0.0000E+00 |
| S7 | 4.1216E+02 | −1.4603E+03 | 2.1873E+03 | −1.7980E+03 | 7.8437E+02 | −1.4120E+02 | 0.0000E+00 |
| S8 | −8.2923E+03 | 1.1176E+04 | −1.0841E+04 | 7.3700E+03 | −3.3308E+03 | 8.9854E+02 | −1.0944E+02 |
| S9 | 4.9820E+02 | −4.4672E+02 | 2.8695E+02 | −1.2862E+02 | 3.8184E+01 | −6.7443E+00 | 5.3650E−01 |
| S10 | −2.5836E−01 | 1.0163E−01 | −2.9972E−02 | 6.3652E−03 | −9.1481E−04 | 7.9448E−05 | −3.1448E−06 |
| S11 | −5.8510E−03 | 9.6425E−04 | −1.0621E−04 | 7.1979E−06 | −2.3849E−07 | −2.6134E−10 | 1.7733E−10 |
| S12 | −1.3282E−03 | 8.8593E−05 | 3.9914E−06 | −1.4454E−06 | 1.3585E−07 | −6.1333E−09 | 1.1298E−10 |
| S13 | −6.9855E−04 | 7.5500E−05 | −5.8404E−06 | 3.1554E−07 | −1.1313E−08 | 2.4199E−10 | −2.3383E−12 |
| S14 | −9.4803E−06 | 9.8915E−07 | −6.9914E−08 | 3.3576E−09 | −1.0531E−10 | 1.9491E−12 | −1.6158E−14 |

FIG. 9 illustrates longitudinal aberration curves of the camera module according to example 2, representing the deviations of focal points converged by light of different wavelengths after passing through the camera module. FIG. 10 illustrates a lateral color curve of the camera module according to example 2, representing the deviations of different image heights on an imaging plane after light passes through the camera module.

It can be seen from FIG. 9 and FIG. 10 that the camera module provided in example 2 may achieve good image quality.

Example 3

Figure 11:
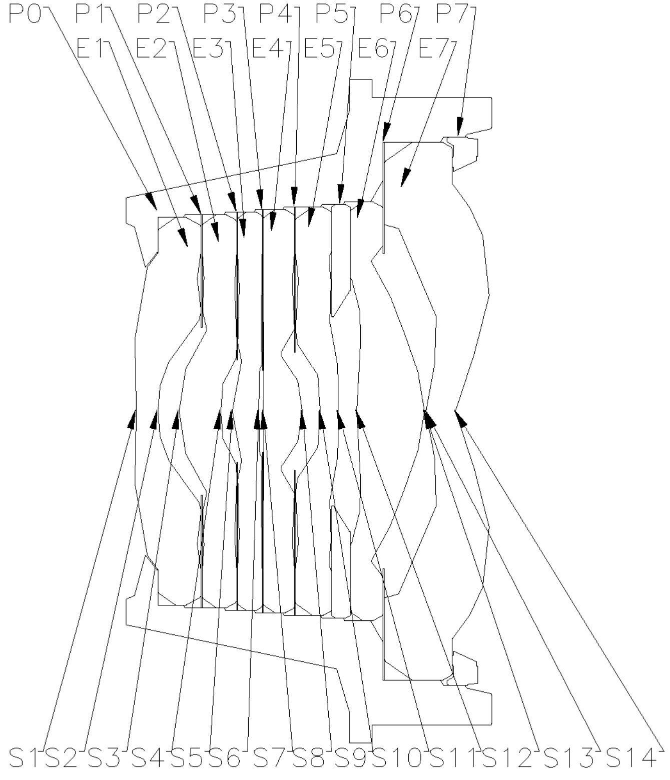
FIG. 11 shows a schematic structural view of a camera module in a first state of example 3 of the present invention.
Figure 12:
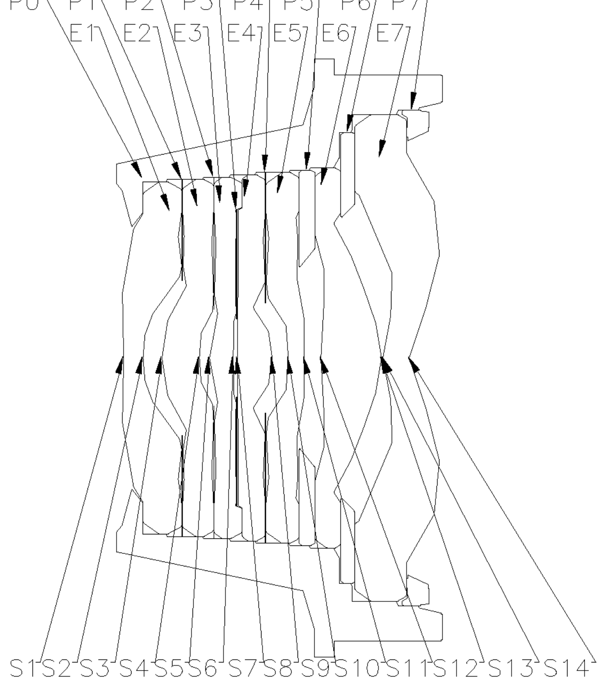
FIG. 12 shows a schematic structural view of a camera module in a second state of example 3 of the present invention.

As shown in FIG. 11 to FIG. 14, a camera module of example 3 is described. FIG. 11 shows a schematic structural view of the camera module of example 3 in a first state. FIG. 12 shows a schematic structural view of the camera module of example 3 in a second state.

As shown in FIG. 11 to FIG. 12, the camera module includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5, a sixth lens E6, a sixth spacer P6, a seventh lens E7 and a pressing ring P7, which are sequentially arranged in the lens barrel P0 along an optical axis of the lens barrel P0 from an object side to an image side. An object-side end of the lens barrel P0 is provided with a supporting portion 10, and an object-side surface S1 of the first lens is at least partially abutted with the supporting portion 10.

As shown in FIG. 11, in the first state of the camera module, the first spacer P1 to the fourth spacer P4 and the sixth spacer P6 are septa, and the fifth spacer P5 is a spacer ring. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. An object-side surface and an image-side surface of the third spacer P3 abut at least partially with an image-side surface S6 of the third lens and an object-side surface S7 of the fourth lens, respectively, and an outer periphery of the third spacer P3 abuts with the internal face of the lens barrel P0. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

As shown in FIG. 12, in the second state of the camera module, the first spacer P1 to the fourth spacer P4 are septa, and the fifth spacer P5 and the sixth spacer P6 are both spacer rings. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. The third lens E3 and the fourth lens E4 are snap-fitted with each other, and the third spacer P3 is located at the position where the third lens E3 and the fourth lens E4 are snap-fitted, so that an object-side surface and an image-side surface of the third spacer P3 abut at least partially with an image-side surface S6 of the third lens and an object-side surface S7 of the fourth lens, respectively, and an outer periphery of the third spacer P3 abuts with the third lens E3. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

In view of the above, the parameters of the camera module in example 3 in the first state 3-1 and the second state 3-2 are shown in Table 7.

TABLE 7

| Parameter | State 3-1 | State 3-2 |
|---|---|---|
| D1s (mm) | 7.599 | 7.699 |
| d1s (mm) | 3.237 | 3.337 |
| D1m (mm) | 7.599 | 7.699 |
| d1m (mm) | 3.237 | 3.337 |
| CP1 (mm) | 0.018 | 0.018 |
| d2s (mm) | 1.982 | 2.082 |
| CP2 (mm) | 0.012 | 0.012 |
| CP3 (mm) | 0.012 | 0.012 |
| EP23 (mm) | 0.480 | 0.480 |
| D3s (mm) | 7.799 | 6.394 |
| D2m (mm) | 7.699 | 7.799 |
| d2m (mm) | 1.982 | 2.082 |
| d3s (mm) | 1.579 | 1.679 |
| d4s (mm) | 2.283 | 2.383 |
| d3m (mm) | 1.579 | 1.679 |
| EP34 (mm) | 0.612 | 0.612 |
| CP4 (mm) | 0.013 | 0.013 |
| D4s (mm) | 7.899 | 7.999 |
| EP45 (mm) | 0.711 | 0.711 |
| CP5 (mm) | 0.350 | 0.350 |
| D5s (mm) | 7.895 | 7.995 |
| d5s (mm) | 3.664 | 3.944 |
| D6s (mm) | 10.391 | 9.631 |

TABLE 7-continued

| Parameter | State 3-1 | State 3-2 |
|---|---|---|
| D5m (mm) | 7.895 | 7.995 |
| EP56 (mm) | 0.642 | 0.558 |
| CP6 (mm) | 0.022 | 0.305 |
| d6s (mm) | 6.090 | 6.097 |
| d6m (mm) | 6.090 | 6.097 |

In example 3, an object-side surface S1 of the first lens is concave, and an image-side surface S2 of the first lens is concave. An object-side surface S3 of the second lens is convex, and an image-side surface S4 of the second lens is concave. An object-side surface S5 of the third lens is convex, and an image-side surface S6 of the third lens is concave. An object-side surface S7 of the fourth lens is convex, and an image-side surface S8 of the fourth lens is convex. An object-side surface S9 of the fifth lens is concave, and an image-side surface S10 of the fifth lens is concave. An object-side surface S11 of the sixth lens is convex, and an image-side surface S12 of the sixth lens is convex. An object-side surface S13 of the seventh lens is convex, and an image-side surface S14 of the seventh lens is concave.

In example 1, a focal length f of the camera module is 2.38 mm, a focal length f1 of the first lens is −3.20 mm, a focal length f2 of the second lens is 9.44 mm, a focal length f3 of the third lens is 7.37 mm, a focal length f4 of the fourth lens is 3.76 mm, a focal length f5 of the fifth lens is −9.62 mm, a focal length f6 of the sixth lens is 3.11 mm, and half of a maximum field-of-view Semi-FOV of the camera module is 74.2°.

Table 8 is a table illustrating basic structural parameters of the camera module of example 3, wherein the units for the radius of curvature and the thickness/distance are millimeter (mm).

TABLE 8

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −2.8397 | 0.4185 | 1.54 | 55.6 | −5.6296 |
| S2 | Aspheric | 4.5868 | 0.4083 | | | −2.0589 |
| S3 | Aspheric | 2.6951 | 0.8069 | 1.62 | 25.9 | −1.5423 |
| S4 | Aspheric | 4.4251 | 0.2196 | | | 13.2386 |
| S5 | Aspheric | 3.7368 | 0.5113 | 1.54 | 56.1 | 1.4960 |
| S6 | Aspheric | 50.0000 | 0.0153 | | | 0.0000 |
| STO | Spherical | Infinite | 0.0747 | | | |
| S7 | Aspheric | 16.4883 | 0.7522 | 1.54 | 56.1 | 0.0000 |
| S8 | Aspheric | −2.3034 | 0.3477 | | | −1.1080 |
| S9 | Aspheric | −13.9399 | 0.3435 | 1.67 | 19.2 | 74.8057 |
| S10 | Aspheric | 12.3520 | 0.3601 | | | −99.0000 |
| S11 | Aspheric | 12.1971 | 1.3094 | 1.54 | 56.1 | 4.9819 |
| S12 | Aspheric | −1.8961 | 0.0300 | | | −0.8702 |
| S13 | Aspheric | 1.7115 | 0.5691 | 1.66 | 20.4 | −0.9494 |
| S14 | Aspheric | 0.9924 | 0.8071 | | | −0.9965 |
| S15 | Spherical | Infinite | 0.2100 | 1.52 | 64.2 | |
| S16 | Spherical | Infinite | 0.4000 | | | |
| S17 | Spherical | Infinite | | | | |

Table 9 shows high-order coefficients applicable to each aspheric surface in example 3, wherein the surface shape of each aspheric surface may be defined by the formula (1) given in the above example 1.

TABLE 9

| Surface number | A4 | A6 | A8 | A10 | A12 | A14 | A16 |
|---|---|---|---|---|---|---|---|
| S1 | 2.5127E−01 | −3.0524E−01 | 2.9520E−01 | −2.2048E−01 | 1.2472E−01 | −5.3122E−02 | 1.7007E−02 |
| S2 | 2.5630E−01 | 2.7219E−02 | −1.4834E+00 | 5.0601E+00 | −1.0101E+01 | 1.3651E+01 | −1.3074E+01 |
| S3 | 1.4997E−02 | −7.1085E−03 | −2.3392E−01 | 1.3300E+00 | −3.7751E+00 | 6.9504E+00 | −8.8848E+00 |
| S4 | 8.8669E−02 | −1.3805E−01 | 1.0756E+00 | 1.3202E−01 | −3.5177E+01 | 2.3168E+02 | −8.3209E+02 |
| S5 | 5.7232E−02 | 2.0612E−01 | −1.7696E+00 | 1.1013E+01 | −4.5231E+01 | 1.2410E+02 | −2.2948E+02 |
| S6 | 7.8639E−03 | 5.8346E−01 | −1.0486E+01 | 1.0010E+02 | −5.6737E+02 | 2.0020E+03 | −4.4397E+03 |
| S7 | 5.9935E−03 | −2.2191E−01 | 2.0576E+00 | −1.3265E+01 | 5.1662E+01 | −1.1388E+02 | 8.1925E+01 |
| S8 | −4.7271E−02 | −1.0420E+00 | 1.1990E+01 | −8.9244E+01 | 4.4707E+02 | −1.5683E+03 | 3.9458E+03 |
| S9 | −1.4335E−01 | 4.7951E−01 | −4.8200E+00 | 2.5914E+01 | −8.8545E+01 | 2.0747E+02 | −3.4594E+02 |
| S10 | −1.2192E−02 | −2.7173E−01 | 6.8990E−01 | −1.1022E+00 | 1.2956E+00 | −1.1669E+00 | 8.1741E−01 |
| S11 | 9.2053E−02 | −2.2750E−01 | 3.4827E−01 | −4.0122E−01 | 3.4281E−01 | −2.1562E−01 | 9.9789E−02 |
| S12 | 1.4909E−01 | −2.3894E−01 | 3.1571E−01 | −2.6897E−01 | 1.5055E−01 | −5.6939E−02 | 1.4631E−02 |
| S13 | −7.8090E−02 | −1.3585E−01 | 2.0427E−01 | −1.4785E−01 | 6.7135E−02 | −2.0704E−02 | 4.4997E−03 |
| S14 | −2.7577E−01 | 1.2784E−01 | −4.1758E−02 | 8.5634E−03 | −9.1480E−04 | −1.4788E−05 | 2.1710E−05 |

| Surface number | A18 | A20 | A22 | A24 | A26 | A28 | A30 |
|---|---|---|---|---|---|---|---|
| S1 | −4.0795E−03 | 7.2736E−04 | −9.4815E−05 | 8.7669E−06 | −5.4410E−07 | 2.0315E−08 | −3.4476E−10 |
| S2 | 9.0352E+00 | −4.5200E+00 | 1.6208E+00 | −4.0587E−01 | 6.7356E−02 | −6.6532E−03 | 2.9599E−04 |
| S3 | 8.0815E+00 | −5.2603E+00 | 2.4290E+00 | −7.7557E−01 | 1.6257E−01 | −2.0096E−02 | 1.1090E−03 |
| S4 | 1.9380E+03 | −3.0766E+03 | 3.3609E+03 | −2.4845E+03 | 1.1850E+03 | −3.2839E+02 | 4.0069E+01 |
| S5 | 2.8172E+02 | −2.1942E+02 | 9.7717E+01 | −1.8853E+01 | 0.0000E+00 | 0.0000E+00 | 0.0000E+00 |
| S6 | 6.0149E+03 | −4.5473E+03 | 1.4698E+03 | 0.0000E+00 | 0.0000E+00 | 0.0000E+00 | 0.0000E+00 |
| S7 | 2.6248E+02 | −8.8450E+02 | 1.2601E+03 | −9.8512E+02 | 4.0875E+02 | −6.9986E+01 | 0.0000E+00 |
| S8 | −7.2078E+03 | 9.5722E+03 | −9.1452E+03 | 6.1218E+03 | −2.7243E+03 | 7.2363E+02 | −8.6789E+01 |
| S9 | 4.1725E+02 | −3.6490E+02 | 2.2897E+02 | −1.0039E+02 | 2.9176E+01 | −5.0477E+00 | 3.9332E−01 |
| S10 | −4.4534E−01 | 1.8627E−01 | −5.8335E−02 | 1.3156E−02 | −2.0088E−03 | 1.8533E−04 | −7.7936E−06 |
| S11 | −3.3940E−02 | 8.4329E−03 | −1.5086E−03 | 1.8885E−04 | −1.5679E−05 | 7.7471E−07 | −1.7231E−08 |
| S12 | −2.4840E−03 | 2.5091E−04 | −8.4112E−06 | −1.2763E−06 | 1.8978E−07 | −1.0485E−08 | 2.2275E−10 |
| S13 | −7.0131E−04 | 7.8697E−05 | −6.3022E−06 | 3.5124E−07 | −1.2942E−08 | 2.8336E−10 | −2.7920E−12 |
| S14 | −3.7521E−06 | 3.7129E−07 | −2.4105E−08 | 1.0481E−09 | −2.9556E−11 | 4.9045E−13 | −3.6435E−15 |

FIG. 13 illustrates longitudinal aberration curves of the camera module according to example 3, representing the deviations of focal points converged by light of different wavelengths after passing through the camera module. FIG. 14 illustrates a lateral color curve of the camera module according to example 3, representing the deviations of different image heights on an imaging plane after light passes through the camera module.

It can be seen from FIG. 13 and FIG. 14 that the camera module provided in example 3 may achieve good image quality.

Example 4

As shown in FIG. 15 to FIG. 18, a camera module of example 4 is described. FIG. 15 shows a schematic structural view of the camera module of example 4 in a first state. FIG. 16 shows a schematic structural view of the camera module of example 4 in a second state.

As shown in FIG. 15 to FIG. 16, the camera module includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5, a sixth lens E6, a sixth spacer P6, a seventh lens E7, and a pressing ring P7, which are sequentially arranged in the lens barrel P0 along an optical axis of the lens barrel P0 from an object side to an image side. An object-side end of the lens barrel P0 is provided with a supporting portion 10, and an object-side surface S1 of the first lens is at least partially abutted with the supporting portion 10.

As shown in FIG. 15, in the first state of the camera module, the first spacer P1 to the fourth spacer P4 and the sixth spacer P6 are septa, and the fifth spacer P5 is a spacer ring. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. An object-side surface and an image-side surface of the third spacer P3 abut at least partially with an image-side surface S6 of the third lens and an object-side surface S7 of the fourth lens, respectively, and an outer periphery of the third spacer P3 abuts with the internal face of the lens barrel P0. An object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the internal face of the lens barrel P0. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

As shown in FIG. 16, in the second state of the camera module, the first spacer P1 to the sixth spacer P6 are septa. An object-side surface and an image-side surface of the first spacer P1 abut at least partially with an image-side surface S2 of the first lens and an object-side surface S3 of the second lens, respectively, and an outer periphery of the first spacer P1 abuts with an internal face of the lens barrel P0. An object-side surface and an image-side surface of the second spacer P2 abut at least partially with an image-side surface S4 of the second lens and an object-side surface S5 of the third lens, respectively, and an outer periphery of the second spacer P2 abuts with the internal face of the lens barrel P0. The third lens E3 and the fourth lens E4 are arranged as being snap-fitted with each other, and the third spacer P3 is located at the position where the third lens E3 and the fourth lens E4 are snap-fitted, so that an object-side surface and an image-side surface of the third spacer P3 abut at least partially with an image-side surface S6 of the third lens and an object-side surface S7 of the fourth lens, respectively, and an outer periphery of the third spacer P3 abuts with the third lens E3. The fourth lens E4 and the fifth lens E5 are arranged as being snap-fitted with each other, and the fourth spacer P4 is located at the position where the fourth lens E4 and the fifth lens E5 are snap-fitted, so that an object-side surface and an image-side surface of the fourth spacer P4 abut at least partially with an image-side surface S8 of the fourth lens and an object-side surface S9 of the fifth lens, respectively, and an outer periphery of the fourth spacer P4 abuts with the fourth lens E4. An object-side surface and an image-side surface of the fifth spacer P5 abut at least partially with an image-side surface S10 of the fifth lens and an object-side surface S11 of the sixth lens, respectively, and an outer periphery of the fifth spacer P5 abuts with the internal face of the lens barrel P0. An object-side surface and an image-side surface of the sixth spacer P6 abut with an image-side surface S12 of the sixth lens and an object-side surface S13 of the seventh lens, respectively, and an outer periphery of the sixth spacer P6 abuts with the internal face of the lens barrel P0. The pressing ring P7 simultaneously abuts an image-side surface S14 of the seventh lens and the internal face of the lens barrel P0.

In view of the above, the parameters of the camera module in example 4 in the first state 4-1 and the second state 4-2 are shown in Table 10.

TABLE 10

| | State | |
|---|---|---|
| Parameter | 4-1 | 4-2 |
| D1s (mm) | 7.981 | 8.081 |
| d1s (mm) | 3.383 | 3.483 |
| D1m (mm) | 7.981 | 8.081 |
| d1m (mm) | 3.383 | 3.483 |
| CP1 (mm) | 0.018 | 0.018 |
| d2s (mm) | 1.930 | 2.030 |
| CP2 (mm) | 0.019 | 0.019 |
| CP3 (mm) | 0.012 | 0.012 |
| EP23 (mm) | 0.520 | 0.520 |
| D3s (mm) | 8.181 | 6.394 |
| D2m (mm) | 8.081 | 8.181 |
| d2m (mm) | 1.930 | 2.030 |
| d3s (mm) | 1.652 | 1.752 |
| d4s (mm) | 2.364 | 2.464 |
| d3m (mm) | 1.652 | 1.752 |
| EP34 (mm) | 0.570 | 0.570 |
| CP4 (mm) | 0.022 | 0.022 |
| D4s (mm) | 8.281 | 6.108 |
| EP45 (mm) | 0.659 | 0.802 |
| CP5 (mm) | 0.379 | 0.033 |
| D5s (mm) | 8.252 | 8.603 |
| d5s (mm) | 3.918 | 3.994 |
| D6s (mm) | 10.864 | 10.964 |
| D5m (mm) | 8.264 | 8.603 |
| EP56 (mm) | 0.534 | 0.736 |
| CP6 (mm) | 0.033 | 0.033 |
| d6s (mm) | 5.872 | 5.972 |
| d6m (mm) | 5.872 | 5.972 |

In example 4, an object-side surface S1 of the first lens is concave, and an image-side surface S2 of the first lens is concave. An object-side surface S3 of the second lens is convex, and an image-side surface S4 of the second lens is concave. An object-side surface S5 of the third lens is convex, and an image-side surface S6 of the third lens is convex. An object-side surface S7 of the fourth lens is convex, and an image-side surface S8 of the fourth lens is convex. An object-side surface S9 of the fifth lens is convex, and an image-side surface S10 of the fifth lens is concave. An object-side surface S11 of the sixth lens is convex, and an image-side surface S12 of the sixth lens is convex. An object-side surface S13 of the seventh lens is convex, and an image-side surface S14 of the seventh lens is concave.

In example 4, a focal length f of the camera module is 2.36 mm, a focal length f1 of the first lens is −3.35 mm, a focal length f2 of the second lens is 12.50 mm, a focal length f3 of the third lens is 6.38 mm, a focal length f4 of the fourth lens is 4.15 mm, a focal length f5 of the fifth lens is −13.13 mm, a focal length f6 of the sixth lens is 2.81 mm, and half of a maximum field-of-view Semi-FOV of the camera module is 75.0°.

Table 11 is a table illustrating basic structural parameters of the camera module of example 4, wherein the units for the radius of curvature and the thickness/distance are millimeter (mm).

TABLE 11

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspheric | −2.8639 | 0.4440 | 1.54 | 55.6 | −0.0001 |
| S2 | Aspheric | 5.0899 | 0.3823 | | | 0.1286 |
| S3 | Aspheric | 2.8144 | 0.9528 | 1.62 | 25.9 | −2.7454 |
| S4 | Aspheric | 3.8490 | 0.2039 | | | 10.1045 |

TABLE 11-continued

| Surface number | Surface type | Radius of curvature | Thickness | Material: Refractive index | Material: Abbe number | Conic coefficient |
|---|---|---|---|---|---|---|
| S5 | Aspheric | 3.9454 | 0.5116 | 1.54 | 56.1 | −1.9855 |
| S6 | Aspheric | −28.4749 | 0.0029 | | | 0.0000 |
| STO | Spherical | Infinite | 0.1115 | | | |
| S7 | Aspheric | 14.7062 | 0.6683 | 1.54 | 56.1 | 0.0000 |
| S8 | Aspheric | −2.6351 | 0.3849 | | | −2.4998 |
| S9 | Aspheric | 30.0000 | 0.3000 | 1.67 | 19.2 | −99.0000 |
| S10 | Aspheric | 6.8352 | 0.4420 | | | −86.7193 |
| S11 | Aspheric | 13.9276 | 1.3031 | 1.54 | 56.1 | −3.0860 |
| S12 | Aspheric | −1.6692 | 0.0300 | | | −0.9092 |
| S13 | Aspheric | 1.6615 | 0.5290 | 1.66 | 20.4 | −0.9488 |
| S14 | Aspheric | 0.9177 | 0.7755 | | | −1.0002 |
| S15 | Spherical | Infinite | 0.2100 | 1.52 | 64.2 | |
| S16 | Spherical | Infinite | 0.4000 | | | |
| S17 | Spherical | Infinite | | | | |

Table 12 shows high-order coefficients applicable to each aspheric surface in example 4, wherein the surface shape of each aspheric surface may be defined by the formula (1) given in the above example 1.

TABLE 12

| Surface number | A4 | A6 | A8 | A10 | A12 | A14 | A16 |
|---|---|---|---|---|---|---|---|
| S1 | 2.6034E−01 | −2.7894E−01 | 2.5735E−01 | −1.8405E−01 | 9.9770E−02 | −4.0704E−02 | 1.2469E−02 |
| S2 | 2.3482E−01 | 3.5054E−02 | −1.3759E+00 | 4.4936E+00 | −8.5901E+00 | 1.1130E+01 | −1.0233E+01 |
| S3 | 1.8574E−02 | −7.8137E−04 | −2.9280E−01 | 1.3577E+00 | −3.3934E+00 | 5.6216E+00 | −6.5375E+00 |
| S4 | 6.5863E−02 | 3.4450E−02 | −5.4844E−01 | 8.4408E+00 | −5.8496E+01 | 2.5001E+02 | −7.2139E+02 |
| S5 | 5.3264E−02 | 1.8506E−01 | −1.5327E+00 | 9.2027E+00 | −3.6460E+01 | 9.6504E+01 | −1.7216E+02 |
| S6 | 1.5287E−03 | 5.0006E−02 | −3.9622E−01 | 1.6677E+00 | −4.1675E+00 | 6.4835E+00 | −6.3392E+00 |
| S7 | 3.8884E−03 | −1.1596E−01 | 8.6606E−01 | −4.4971E+00 | 1.4107E+01 | −2.5048E+01 | 1.4514E+01 |
| S8 | −5.3170E−02 | −8.6409E−01 | 1.0051E+01 | −7.2847E+01 | 3.5254E+02 | −1.1918E+03 | 2.8867E+03 |
| S9 | −1.8367E−01 | 5.0212E−01 | −4.0633E+00 | 2.0238E+01 | −6.5832E+01 | 1.4777E+02 | −2.3619E+02 |
| S10 | −5.1377E−02 | −1.5903E−01 | 4.9619E−01 | −9.4677E−01 | 1.3257E+00 | −1.3889E+00 | 1.0949E+00 |
| S11 | 5.1143E−02 | −1.2673E−01 | 1.9397E−01 | −2.3516E−01 | 2.1171E−01 | −1.3883E−01 | 6.6377E−02 |
| S12 | 1.4048E−01 | −2.2869E−01 | 3.4028E−01 | −3.3068E−01 | 2.1208E−01 | −9.2675E−02 | 2.7945E−02 |
| S13 | −1.0008E−01 | −1.2445E−01 | 2.0400E−01 | −1.5164E−01 | 6.8371E−02 | −1.9919E−02 | 3.7424E−03 |
| S14 | −3.0874E−01 | 1.4775E−01 | −5.0334E−02 | 1.1083E−02 | −1.3960E−03 | 4.0346E−05 | 1.9140E−05 |

| Surface number | A18 | A20 | A2 | A24 | A26 | A28 | A30 |
|---|---|---|---|---|---|---|---|
| S1 | −2.8574E−03 | 4.8571E−04 | −6.0210E−05 | 5.2771E−06 | −3.0922E−07 | 1.0847E−08 | −1.7189E−10 |
| S2 | 6.7977E+00 | −3.2731E+00 | 1.1312E+00 | −2.7335E−01 | 4.3825E−02 | −4.1858E−03 | 1.8016E−04 |
| S3 | 5.4488E+00 | −3.2689E+00 | 1.3986E+00 | 4.1606E−01 | 8.1709E−02 | −9.5188E−03 | 4.9797E−04 |
| S4 | 1.4590E+03 | −2.0942E+03 | 2.1206E+03 | −1.4770E+03 | 6.7074E+02 | −1.7791E+02 | 2.0778E+01 |
| S5 | 2.0389E+02 | −1.5320E+02 | 6.5818E+01 | −1.2251E+01 | 0.0000E+00 | 0.0000E+00 | 0.0000E+00 |
| S6 | 3.7865E+00 | −1.2621E+00 | 1.7986E−01 | 0.0000E+00 | 0.0000E+00 | 0.0000E+00 | 0.0000E+00 |
| S7 | 3.7454E+01 | −1.0166E+02 | 1.1665E+02 | −7.3457E+01 | 2.4549E+01 | −3.3856E+00 | 0.0000E+00 |
| S8 | −5.0738E+03 | 6.4818E+03 | −5.9562E+03 | 3.8347E+03 | −1.6412E+03 | 4.1929E+02 | −4.8365E+01 |
| S9 | 2.7274E+02 | −2.2806E+02 | 1.3669E+02 | −5.7211E+01 | 1.5868E+01 | −2.6198E+00 | 1.9479E−01 |
| S10 | −6.5083E−01 | 2.9044E−01 | −9.5820E−02 | 2.2643E−02 | −3.6172E−03 | 3.4918E−04 | −1.5363E−05 |
| S11 | −2.3148E−02 | 5.8557E−03 | −1.0593E−03 | 1.3323E−04 | −1.1047E−05 | 5.4222E−07 | −1.1922E−08 |
| S12 | −5.7583E−03 | 7.7734E−04 | −6.0542E−05 | 1.2933E−06 | 2.0525E−07 | −1.8495E−08 | 4.9296E−10 |
| S13 | −4.1523E−04 | 1.5391E−05 | 2.6579E−06 | −4.7239E−07 | 3.4761E−08 | −1.3010E−09 | 2.0241E−11 |
| S14 | −3.9966E−06 | 4.2588E−07 | −2.8931E−08 | 1.3000E−09 | −3.7622E−11 | 6.3789E−13 | −4.8274E−15 |

FIG. 17 illustrates longitudinal aberration curves of the camera module according to example 4, representing the deviations of focal points converged by light of different wavelengths after passing through the camera module. FIG. 18 illustrates a lateral color curve of the camera module according to example 4, representing the deviations of different image heights on an imaging plane after light passes through the camera module.

It can be seen from FIG. 17 and FIG. 18 that the camera module provided in example 4 may achieve good image quality.

In view of the above, examples 1 to 4 respectively satisfy the relationship shown in Table 13.

TABLE 13

| Conditional/Example | 1-1 | 1-2 | 2-1 | 2-2 | 3-1 | 3-2 | 4-1 | 4-2 |
|---|---|---|---|---|---|---|---|---|
| R2*(D1s-d1s)/(R3*(D1m-d1m)) | 55.54 | 55.54 | 24.32 | 24.32 | 32.38 | 32.38 | 38.23 | 38.23 |
| f1/D1s + T12/CP1 | 20.23 | 16.47 | 13.70 | 13.70 | 22.26 | 22.27 | 20.82 | 20.82 |
| f2/(d1m-d2s) | 8.92 | 8.92 | 6.11 | 6.11 | 7.52 | 7.52 | 8.60 | 8.60 |
| f2*(T12 + CP1)/(f1*(T34 + CP2)) | −6.80 | −6.87 | −10.22 | −10.22 | −12.34 | −12.34 | −11.21 | −11.21 |
| f3/CT3 + f3/(EP23 + CP3) | 35.43 | 35.47 | 37.35 | 37.31 | 29.38 | 29.38 | 24.47 | 24.47 |
| R5/\|D3s-D2m\| + R5/(d2m-d3s) | 66.62 | 12.50 | 56.38 | 13.43 | 46.63 | 11.92 | 53.62 | 16.38 |
| f4/CT4 + (d4s-d3m)/EP34 | 7.10 | 7.10 | 6.16 | 6.16 | 6.14 | 6.14 | 7.46 | 7.46 |
| T45/CP4 + D4s/R8 | 9.22 | 9.17 | 21.22 | 21.18 | 23.32 | 23.28 | 14.35 | 15.18 |
| f5/(CT5 + T56) + f5/(EP45 + CP5) | −17.45 | −17.90 | −20.78 | −20.78 | −22.73 | −22.73 | −30.36 | −33.43 |
| \|R9/R10\|*(D5s/d5s) | 1.96 | 1.90 | 2.74 | 2.71 | 2.43 | 2.29 | 9.24 | 9.45 |
| (f5 + f6)/(D6s-D5m) | −2.38 | −2.55 | −5.61 | −6.05 | −2.61 | −3.98 | −3.97 | −4.37 |
| f6/EP56 + f6/CT6 | 5.67 | 5.33 | 5.82 | 6.34 | 7.22 | 7.95 | 7.43 | 5.98 |
| \|d6m/f7\| + + T67/CP6 | 8.17 | 8.19 | 5.65 | 1.65 | 2.54 | 1.27 | 2.28 | 2.30 |
| Tan(Semi-FOV) + \|d6s/f7\| | 5.04 | 5.06 | 5.06 | 5.10 | 4.70 | 4.70 | 5.11 | 5.13 |

In Table 13, it should be noted that 1-1 represents the camera module in example 1 in the first state, 1-2 represents the camera module in example 1 in the second state, 2-1 represents the camera module in example 2 in the first state, 2-2 represents the camera module in example 2 in the second state, 3-1 represents the camera module in example 3 in the first state, 3-2 represents the camera module in example 3 in the second state, 4-1 represents the camera module in example 4 in the first state, and 4-2 represents the camera module in example 4 in the second state.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera module described above.

Obviously, the examples described above are only part of the examples of the present invention, not all of them. Based on the examples in the present invention, all other examples obtained by ordinary technicians in the art without creative work should fall within the scope of protection of the present invention.

It should be noted that the terms used herein are only intended to describe specific embodiments and are not intended to limit exemplary embodiments according to the present disclosure. As used herein, the singular form is also intended to include the plural form, unless the context explicitly indicates otherwise. In addition, it should be further understood that when the terms "comprising" and/or "including" are used in this specification, they indicate the presence of features, steps, work, devices, components, and/or combinations its.

It should be noted that the terms "first", "second", and the like in the description and claims of the present disclosure and the above drawings are used to distinguish similar objects, and need not be used to describe a specific order or precedence order. It should be understood that the data used in this manner may be interchanged where appropriate, so that the embodiments of the present disclosure described herein may be implemented in a sequence other than those illustrated or described herein.

The above description is only a preferred example of the invention and is not intended to limit the invention. For those skilled in the art, the invention can have various changes and variations. Any modification, equivalent replacement, improvement, etc. made within the spirit and principles of the invention shall be included in the scope of protection of the invention.

What is claimed is:

1. A camera module comprising:

a lens barrel; and a first lens, a second lens, a third lens, a fourth lens, a fifth lens, a sixth lens, and a seventh lens having a negative refractive power, that are sequentially arranged in the lens barrel along an optical axis of the camera module from an object side to an image side, wherein the camera module further comprises a first spacer arranged between the first lens and the second lens on the optical axis, a second spacer arranged between the first lens and the second lens on the optical axis, a third spacer arranged between the third lens and the fourth lens on the optical axis, a fourth spacer arranged between the fourth lens and the fifth lens on the optical axis, a fifth spacer arranged between the fifth lens and the sixth lens on the optical axis, and a sixth spacer arranged between the sixth lens and the seventh lens on the optical axis of the camera module;

$$1.0 < |d6m/f7| + T67/CP6 < 8.5, \text{ and}$$

$$6.0 < f4/CT4 + (d4s - d3m)/EP34 < 7.5.$$

where f7 is an effective focal length of the seventh lens, dom is an inner diameter of an image-side surface of the sixth spacer, T67 is an air interval between the sixth lens and the seventh lens along the optical axis, CP6 is a maximum thickness of the sixth spacer, f4 is an effective focal length of the fourth lens, CT4 is a center thickness of the fourth lens along the optical axis, d4s is an inner diameter of an object-side surface of the fourth spacer, d3m is an inner diameter of an image-side surface of the third spacer, and EP34 is an interval between the third spacer and the fourth spacer.

2. The camera module according to claim 1, wherein each spacer in the first to sixth spacers is at least partially in contact with an image-side surface of a lens arranged on an object side of the sixth spacer, and each spacer in the first to sixth spacers is capable of shielding light from entering an edge structure portion of a lens arranged on an image side of the sixth spacer; an object-side end of the lens barrel is provided with a supporting portion extending in a direction directing to the optical axis, and an object-side surface of the first lens is at least partially abutted with the supporting portion.

3. The camera module according to claim 1, wherein the first spacer to the sixth spacer comprise one or more kinds of: spacer ring, septum.

4. The camera module according to claim 1, wherein each of the first spacer to the sixth spacer is a septum; or the fifth spacer is a spacer ring, and each of the first spacer to the fourth spacer and the sixth spacer is a septum; or each of the fifth spacer and the sixth spacer is a spacer ring, and each of the first spacer to the fourth spacer is a septum.

5. The camera module according to claim 1, wherein the camera module further comprises a pressing ring, the pressing ring being arranged on an image side of the seventh lens and abutting simultaneously with an image-side surface of the seventh lens and an internal face of the lens barrel.

6. The camera module according to claim 1, wherein the third lens and the fourth lens are arranged as being snap-fitted; and an outer periphery of the third spacer abuts with the third lens; or the fourth lens and the fifth lens are arranged as being snap-fitted, and an outer periphery of the fourth spacer abuts with the fourth lens.

7. The camera module according to claim 1, wherein outer peripheries of the first to sixth spacers comprise one or more kinds of: abutting with a lens, abutting with an internal face of the lens barrel; when an outer periphery of a spacer abuts a lens, two adjacent lenses adjacent with the sixth spacer are arranged as being snap-fitted, the sixth spacer is located at a position where the two adjacent lenses are snap-fitted, and the outer periphery of the sixth spacer abuts a lens located on the object side in the two adjacent lenses.

8. The camera module according to claim 1, wherein $24.0<R2*(D1s-d1s)/(R3*(D1m-d1m))<56.0$, where R2 is a radius of curvature of an image-side surface of the first lens, R3 is a radius of curvature of an object-side surface of the second lens, D1s is an outer diameter of an object-side surface of the first spacer, D1m is an outer diameter of an image-side surface of the first spacer, dis is an inner diameter of the object-side surface of the first spacer, and d1m is an inner diameter of the image-side surface of the first spacer.

9. The camera module according to claim 1, wherein $13.0<f1/D1s+T12/CP1<23.0$, where f1 is an effective focal length of the first lens, D1s is an outer diameter of an object-side surface of the first spacer, CP1 is a maximum thickness of the first spacer, and T12 is an air interval between the first lens and the second lens along the optical axis.

10. The camera module according to claim 1, wherein $6.0<f2/(d1m-d2s)<9.0$, where f2 is an effective focal length of the second lens, dim is an inner diameter of an image-side surface of the first spacer, and d2s is an inner diameter of an object-side surface of the second spacer.

11. The camera module according to claim 1, wherein $-13.0<f2*(T12+CP1)/(f1*(T34+CP2))<-6.5$, where f1 is an effective focal length of the first lens, f2 is an effective focal length of the second lens, T12 is an air interval between the first lens and the second lens along the optical axis, T34 is an air interval between the third lens and the fourth lens along the optical axis, CP1 is a maximum thickness of the first spacer, and CP2 is a maximum thickness of the second spacer.

12. The camera module according to claim 1, wherein $24.0<f3/CT3+f3/(EP23+CP3)<38.0$, where f3 is an effective focal length of the third lens, CT3 is a center thickness of the third lens along the optical axis, EP23 is an interval between the second spacer and the third spacer, and CP3 is a maximum thickness of the third spacer.

13. The camera module according to claim 1, wherein $9.0<T45/CP4+D4s/R8<24.0$,

T45 is an air interval between the fourth lens and the fifth lens along the optical axis, CP4 is a maximum thickness of the fourth spacer, D4s is an outer diameter of an object-side surface of the fourth spacer, and R8 is a radius of curvature of an image-side surface of the fourth lens.

14. The camera module according to claim 1, wherein $$-34.0<f5/(CT5+T56)+f5/(EP45+CP5)<-17.0,$$

where f5 is an effective focal length of the fifth lens, CT5 is a center thickness of the fifth lens along the optical axis, T56 is an air interval between the fifth lens and the sixth lens along the optical axis, EP45 is an interval between the fourth spacer and the fifth spacer, and CP5 is a maximum thickness of the fifth spacer.

15. The camera module according to claim 1, wherein $$1.5<|R9/R10|*(D5s/d5s)<10.0,$$

R9 is a radius of curvature of an object-side surface of the fifth lens, R10 is a radius of curvature of an image-side surface of the fifth lens, D5s is an outer diameter of an object-side surface of the fifth spacer, and d5s is an inner diameter of an object-side surface of the fifth spacer.

16. The camera module according to claim 1, wherein $$-6.5<(f5+f6)/(D6s-D5m)<-2.0,$$

f5 is an effective focal length of the fifth lens, f6 is an effective focal length of the sixth lens, Dos is an outer diameter of an object-side surface of the sixth spacer, and D5m is an outer diameter of an image-side surface of the fifth spacer.

17. The camera module according to claim 1, wherein $$5.0<f6/EP56+f6/CT6<8.0,$$

f6 is an effective focal length of the sixth lens, CT6 is a center thickness of the sixth lens along the optical axis, and EP56 is an interval between the fifth spacer and the sixth spacer.

18. The camera module according to claim 1, wherein $$4.0<\mathrm{Tan(Semi\text{-}FOV)}+|d6s/f7|<5.5,$$

Semi-FOV is half of a maximum field-of-view of the camera module, and d6s is an inner diameter of an object-side surface of the sixth spacer.

19. A camera module comprising:

a lens barrel; and a first lens, a second lens, a third lens, a fourth lens, a fifth lens, a sixth lens, and a seventh lens having a negative refractive power, that are sequentially arranged in the lens barrel along an optical axis of the camera module from an object side to an image side, wherein the camera module further comprises a first spacer arranged between the first lens and the second lens on the optical axis, a second spacer arranged between the first lens and the second lens on the optical axis, a third spacer arranged between the third lens and the fourth lens on the optical axis, a fourth spacer arranged between the fourth lens and the fifth lens on the optical axis, a fifth spacer arranged between the fifth lens and the sixth lens on the optical axis, and a sixth spacer arranged between the sixth lens and the seventh lens on the optical axis of the camera module;

$$1.0 < |d6m/f7| + T67/CP6 < 8.5, \text{ and}$$

$$9.0 < T45/CP4 + D4s/R8 < 24.0,$$

where f7 is an effective focal length of the seventh lens, d6m is an inner diameter of an image-side surface of the sixth spacer, T67 is an air interval between the sixth lens and the seventh lens along the optical axis, CP6 is a maximum thickness of the sixth spacer, T45 is an air interval between the fourth lens and the fifth lens along the optical axis, CP4 is a maximum thickness of the fourth spacer, D4s is an outer diameter of an object-side surface of the fourth spacer, and R8 is a radius of curvature of an image-side surface of the fourth lens.

20. A camera module comprising:

a lens barrel; and a first lens, a second lens, a third lens, a fourth lens, a fifth lens, a sixth lens, and a seventh lens having a negative refractive power, that are sequentially arranged in the lens barrel along an optical axis of the camera module from an object side to an image side, wherein the camera module further comprises a first spacer arranged between the first lens and the second lens on the optical axis, a second spacer arranged between the first lens and the second lens on the optical axis, a third spacer arranged between the third lens and the fourth lens on the optical axis, a fourth spacer arranged between the fourth lens and the fifth lens on the optical axis, a fifth spacer arranged between the fifth lens and the sixth lens on the optical axis, and a sixth spacer arranged between the sixth lens and the seventh lens on the optical axis of the camera module;

$$1.0 < |d6m/f7| + T67/CP6 < 8.5, \text{ and}$$

$$-34.0 < f5/(CT5 + T56) + f5/(EP45 + CP5) < -17.0,$$

where f7 is an effective focal length of the seventh lens, d6m is an inner diameter of an image-side surface of the sixth spacer, T67 is an air interval between the sixth lens and the seventh lens along the optical axis, CP6 is a maximum thickness of the sixth spacer, f5 is an effective focal length of the fifth lens, CT5 is a center thickness of the fifth lens along the optical axis, T56 is an air interval between the fifth lens and the sixth lens along the optical axis, EP45 is an interval between the fourth spacer and the fifth spacer, and CP5 is a maximum thickness of the fifth spacer.

* * * * *